US012462618B1

(12) United States Patent
Mifsud et al.

(10) Patent No.: US 12,462,618 B1
(45) Date of Patent: Nov. 4, 2025

(54) VEHICLE ANALYSIS SERVICE FOR PROVIDING LOGIC FOR LOCAL ANALYSIS AND ADDITIONAL REMOTE SUPPORT

(71) Applicant: Amazon Technologies, Inc., Seattle, WA (US)

(72) Inventors: David Joseph Mifsud, Bothell, WA (US); Michael Garcia, Springfield, MO (US); Edwin Ricardo Mendez Rodriguez, Seattle, WA (US); Brett Francis, Redwood City, CA (US); Matthew Jonathan Narksusook, Auburn, WA (US); Abhijit Dayakar, Santa Clara, CA (US); Desmond O'Neil Davis, San Leandro, CA (US)

(73) Assignee: Amazon Technologies, Inc., Seattle, WA (US)

( * ) Notice: Subject to any disclaimer, the term of this patent is extended or adjusted under 35 U.S.C. 154(b) by 317 days.

(21) Appl. No.: 17/164,720

(22) Filed: Feb. 1, 2021

(51) Int. Cl.
*G07C 5/00* (2006.01)
*G06F 3/16* (2006.01)
(Continued)

(52) U.S. Cl.
CPC ............. *G07C 5/008* (2013.01); *G06F 3/167* (2013.01); *G06Q 10/20* (2013.01); *G07C 5/0808* (2013.01); *G08G 1/20* (2013.01)

(58) Field of Classification Search
CPC ....... G07C 5/008; G07C 5/0808; G06F 3/167; G06Q 10/20; G08G 1/20
(Continued)

(56) References Cited

U.S. PATENT DOCUMENTS 5,400,018 A * 3/1995 Scholl ..................... G08G 1/20
340/10.3
7,103,460 B1 * 9/2006 Breed .................... G07C 5/008
706/15
(Continued)

FOREIGN PATENT DOCUMENTS

CN 103793787 A * 5/2014
CN 110351314 10/2019
(Continued)

OTHER PUBLICATIONS

Lili Zhang et al., "A DRM System Based on PKI", 2010 Fourth International Conference on Genetic and Evolutionary Computing, IEEE, 2010, pp. 522-525.
(Continued)

*Primary Examiner* — Helal A Algahaim
*Assistant Examiner* — Merritt E Levy
(74) *Attorney, Agent, or Firm* — Alexander A. Knapp; Kowert, Hood, Munyon, Rankin & Goetzel, P.C.

(57) ABSTRACT

A system comprising one or more computing devices implements a vehicle analysis service, which generates logical instructions for deployment to a vehicle or a fleet of vehicles to implement in-vehicle data analysis in the vehicle or fleet of vehicles. Additionally, the vehicle analysis service and/or locally deployed analysis module provides updates based on newly learned trends in vehicle data or newly learned correlations for the vehicle or similarly situated vehicles. The vehicle analysis service and locally deployed analysis module enables analysis to be performed using detailed high-resolution vehicle data, without requiring large volumes of vehicle data to be streamed to a remote location for analysis. Also, the vehicle analysis service provides customized analysis modules that can perform local analysis using
(Continued)

existing computing resources of the vehicle or the vehicles of the fleet.

20 Claims, 20 Drawing Sheets

(51) Int. Cl.
   *G06Q 10/20* (2023.01)
   *G07C 5/08* (2006.01)
   *G08G 1/00* (2006.01)

(58) Field of Classification Search
   USPC .......................................................... 701/29.3
   See application file for complete search history.

(56) References Cited

U.S. PATENT DOCUMENTS

| | | | |
|---|---|---|---|
| 7,715,961 B1* | 5/2010 | Kargupta | G06Q 10/08 701/33.2 |
| 8,930,402 B1 | 1/2015 | Sing | |
| 9,104,537 B1* | 8/2015 | Penilla | G06Q 10/20 |
| 9,280,653 B2 | 3/2016 | Forest | |
| 9,430,225 B2 | 8/2016 | Ko | |
| 9,764,742 B1* | 9/2017 | Goldfarb | G07C 5/008 |
| 9,854,442 B2* | 12/2017 | Mazzara, Jr. | H04L 67/12 |
| 9,984,420 B1* | 5/2018 | Manzella | G06Q 40/08 |
| 10,540,892 B1* | 1/2020 | Fields | B60W 40/09 |
| 10,666,767 B1 | 5/2020 | Floyd | |
| 10,802,481 B1* | 10/2020 | Menon | B64F 5/40 |
| 11,025,598 B1 | 6/2021 | Laghaelan | |
| 11,037,177 B1* | 6/2021 | Chan | G06Q 40/03 |
| 11,553,363 B1* | 1/2023 | Chan | H04L 41/145 |
| 11,790,458 B1* | 10/2023 | Menon | G07C 5/008 705/4 |
| 2002/0007237 A1 | 1/2002 | Phung | |
| 2003/0009270 A1* | 1/2003 | Breed | B60R 21/233 701/32.4 |
| 2003/0055666 A1* | 3/2003 | Roddy | G07C 5/008 705/305 |
| 2003/0093199 A1 | 5/2003 | Mavreas | |
| 2007/0026876 A1 | 2/2007 | Freilich | |
| 2008/0080459 A1 | 4/2008 | Kotecha | |
| 2009/0171548 A1 | 7/2009 | Hyde | |
| 2010/0228404 A1 | 9/2010 | Link | |
| 2011/0224865 A1* | 9/2011 | Gordon | G07C 5/085 701/29.6 |
| 2012/0041638 A1 | 2/2012 | Johnson | |
| 2013/0275761 A1 | 10/2013 | Catsburg | |
| 2014/0059534 A1 | 2/2014 | Daum | |
| 2014/0075198 A1 | 3/2014 | Peirce | |
| 2014/0079217 A1 | 3/2014 | Bai | |
| 2014/0123123 A1 | 5/2014 | Bahls | |
| 2014/0195100 A1 | 7/2014 | Lunggsgaard | |
| 2014/0228061 A1* | 8/2014 | Draznin | H04L 12/1895 455/466 |
| 2014/0310702 A1* | 10/2014 | Ricci | G06F 3/013 717/173 |
| 2015/0105933 A1* | 4/2015 | Martin | G07C 5/0866 701/1 |
| 2015/0180840 A1 | 6/2015 | Jung | |
| 2015/0193220 A1 | 7/2015 | Rork | |
| 2015/0286475 A1 | 10/2015 | Vangelov | |
| 2015/0288636 A1 | 10/2015 | Yalavarty | |
| 2015/0301821 A1 | 10/2015 | Danne | |
| 2015/0371457 A1* | 12/2015 | Bakfan | G07C 5/0841 701/29.3 |
| 2016/0035152 A1* | 2/2016 | Kargupta | G06F 16/955 701/31.5 |
| 2016/0078695 A1* | 3/2016 | McClintic | G07C 5/0816 701/29.4 |
| 2016/0099806 A1 | 4/2016 | Racklyeft et al. | |
| 2016/0099927 A1 | 4/2016 | Oz | |
| 2016/0140779 A1 | 5/2016 | Takenaka | |
| 2016/0196131 A1 | 7/2016 | Searle | |
| 2016/0330032 A1 | 11/2016 | Naim et al. | |
| 2017/0086054 A1 | 3/2017 | Azevedo | |
| 2017/0187787 A1 | 6/2017 | Syamala | |
| 2017/0193026 A1 | 7/2017 | Pettovello | |
| 2017/0200324 A1 | 7/2017 | Chennakeshu | |
| 2017/0242678 A1 | 8/2017 | Sangameswaran | |
| 2017/0251339 A1 | 8/2017 | Addepalli | |
| 2017/0262274 A1 | 9/2017 | Vangelov | |
| 2017/0315797 A1 | 11/2017 | Vangelov | |
| 2017/0331795 A1 | 11/2017 | Martin | |
| 2017/0358204 A1* | 12/2017 | Modica | G08G 1/0129 |
| 2018/0024826 A1 | 1/2018 | Caushi | |
| 2018/0048473 A1 | 2/2018 | Miller | |
| 2018/0081670 A1 | 3/2018 | Caushi | |
| 2018/0088589 A1 | 3/2018 | Hasegawa | |
| 2018/0091596 A1 | 3/2018 | Alvarez | |
| 2018/0145991 A1 | 5/2018 | McCauley | |
| 2018/0196656 A1 | 7/2018 | Miller | |
| 2018/0217828 A1 | 8/2018 | Madrid | |
| 2018/0217831 A1 | 8/2018 | Madrid | |
| 2018/0310159 A1* | 10/2018 | Katz | H04M 3/5116 |
| 2019/0050220 A1 | 2/2019 | Daum | |
| 2019/0065933 A1 | 2/2019 | Bogdoll | |
| 2019/0080528 A1* | 3/2019 | Bednar | G07C 5/006 |
| 2019/0087168 A1 | 3/2019 | Carranza | |
| 2019/0088104 A1 | 3/2019 | Crewe | |
| 2019/0140886 A1 | 5/2019 | Zywicki | |
| 2019/0146775 A1 | 5/2019 | Wang | |
| 2019/0206156 A1 | 7/2019 | Ponda | |
| 2019/0212348 A9 | 7/2019 | Schwoebel | |
| 2019/0258727 A1 | 8/2019 | Schmotzer et al. | |
| 2019/0259223 A1 | 8/2019 | Sangameswaran | |
| 2019/0279440 A1* | 9/2019 | Ricci | H04W 4/48 |
| 2019/0304213 A1* | 10/2019 | Chen | G07C 5/0833 |
| 2019/0311556 A1* | 10/2019 | Thron | G07C 5/008 |
| 2019/0391800 A1* | 12/2019 | Lin | H04L 67/125 |
| 2020/0028946 A1 | 1/2020 | Vora | |
| 2020/0029209 A1 | 1/2020 | Nolscher | |
| 2020/0043063 A1* | 2/2020 | London | G05D 1/0088 |
| 2020/0074864 A1 | 3/2020 | McErlean | |
| 2020/0089487 A1 | 3/2020 | Ramic et al. | |
| 2020/0111272 A1* | 4/2020 | Ferre Fabregas | G05B 23/0283 |
| 2020/0114910 A1 | 4/2020 | Han | |
| 2020/0162912 A1 | 5/2020 | Schaaf | |
| 2020/0198651 A1* | 6/2020 | Levy | G05D 1/0297 |
| 2020/0234249 A1* | 7/2020 | Chamon | G06Q 10/1095 |
| 2020/0234515 A1* | 7/2020 | Gronsbell | G06F 3/0482 |
| 2020/0313873 A1 | 10/2020 | Mondello | |
| 2020/0334924 A1 | 10/2020 | Wells | |
| 2020/0364953 A1 | 11/2020 | Simoudis | |
| 2020/0410787 A1 | 12/2020 | Petousis | |
| 2021/0012588 A1* | 1/2021 | Kwon | G07C 5/0825 |
| 2021/0058814 A1 | 2/2021 | Puranic | |
| 2021/0101607 A1* | 4/2021 | Du | G07C 5/085 |
| 2022/0294685 A1 | 9/2022 | Li | |
| 2022/0319255 A1* | 10/2022 | Palai | G07C 5/008 |
| 2023/0102153 A1 | 3/2023 | Floyd | |
| 2023/0115145 A1* | 4/2023 | Sanchez | G06F 11/3476 705/7.31 |
| 2023/0169805 A1 | 6/2023 | Ramnani et al. | |
| 2023/0171314 A1 | 6/2023 | Srinivasan et al. | |
| 2023/0260336 A1 | 8/2023 | Nishie | |

FOREIGN PATENT DOCUMENTS

| | | | | |
|---|---|---|---|---|
| CN | 113590359 A | | 11/2021 | |
| CN | 114338542 | | 4/2022 | |
| EP | 2736225 | | 5/2014 | |
| EP | 3700243 A1 | | 8/2020 | |
| EP | 3319266 | | 1/2021 | |
| FR | 3003382 A1 | * | 9/2014 | ............ G06Q 10/00 |
| GB | 2525654 A | * | 11/2015 | ............ G07C 5/008 |
| JP | 2002202895 A | | 7/2002 | |
| JP | 2007214696 A | | 8/2007 | |
| JP | 2019160199 A | | 9/2019 | |
| JP | 2020035014 A | | 3/2020 | |
| KR | 20170025955 A | | 3/2017 | |
| WO | 2007092247 A2 | | 8/2007 | |

(56) References Cited

FOREIGN PATENT DOCUMENTS

| WO | 2012160668 | A1 | | 11/2012 | | |
|----|-----------|----|--|---------|--|--|
| WO | 2017058724 | | | 4/2017 | | |
| WO | 2017217070 | | | 12/2017 | | |
| WO | 2018057321 | | | 3/2018 | | |
| WO | 2019126707 | A1 | | 6/2019 | | |
| WO | WO-2019213177 | A1 | * | 11/2019 | | |
| WO | WO-2020097221 | A1 | * | 5/2020 | ............. | B60K 35/00 |
| WO | WO-2020183954 | A1 | * | 9/2020 | ............. | G07C 5/008 |
| WO | WO-2020191225 | A1 | * | 9/2020 | .......... | G06F 11/1451 |
| WO | 2022069033 | | | 7/2022 | | |

OTHER PUBLICATIONS

Mattias Ohrn, "Publice Key Infrastructure Utilisation in Digital Rights Management", KTH Numerical Analysis and Computer Science, 2004, pp. 1-84.

Sayfan, Gigi, "Matering Kubernetes," May 17, 2017, Packt Publishing Ltd., Birmingham UK.

U.S. Appl. No. 16/835,070, filed Mar. 30, 2020, Brett Francis, et al.

U.S. Appl. No. 16/581,571, filed Sep. 24, 2019, Michael Christopher Wenneman, et al.

U.S. Appl. No. 17/160,184, filed Jan. 27, 2021, Assimakis Tzamaloukas, et al.

U.S. Appl. No. 17/537,320, filed Nov. 29, 2021, Raghuram Onti Srinivasan, et al.

U.S. Appl. No. 16/453,921, filed Jun. 26, 2019, Marco Argenti, et al.

U.S. Appl. No. 17/548,392, filed Dec. 10, 2021, Bhushan Ramnani, et al.

Jiyong Han, et al., "GS1 Connected Car: An Integrated Vehicle Information Platform and Its Ecosystem for Connected Car Services based on GS1 Standards", 2018 IEEE Intelligent Vehicles Symposium (IV), IEEE, Jun. 26, 2018, pp. 367-374.

U.S. Appl. No. 18/544,222, filed Dec. 18, 2023, Assimakis Tzamaloukas, et al.

\* cited by examiner

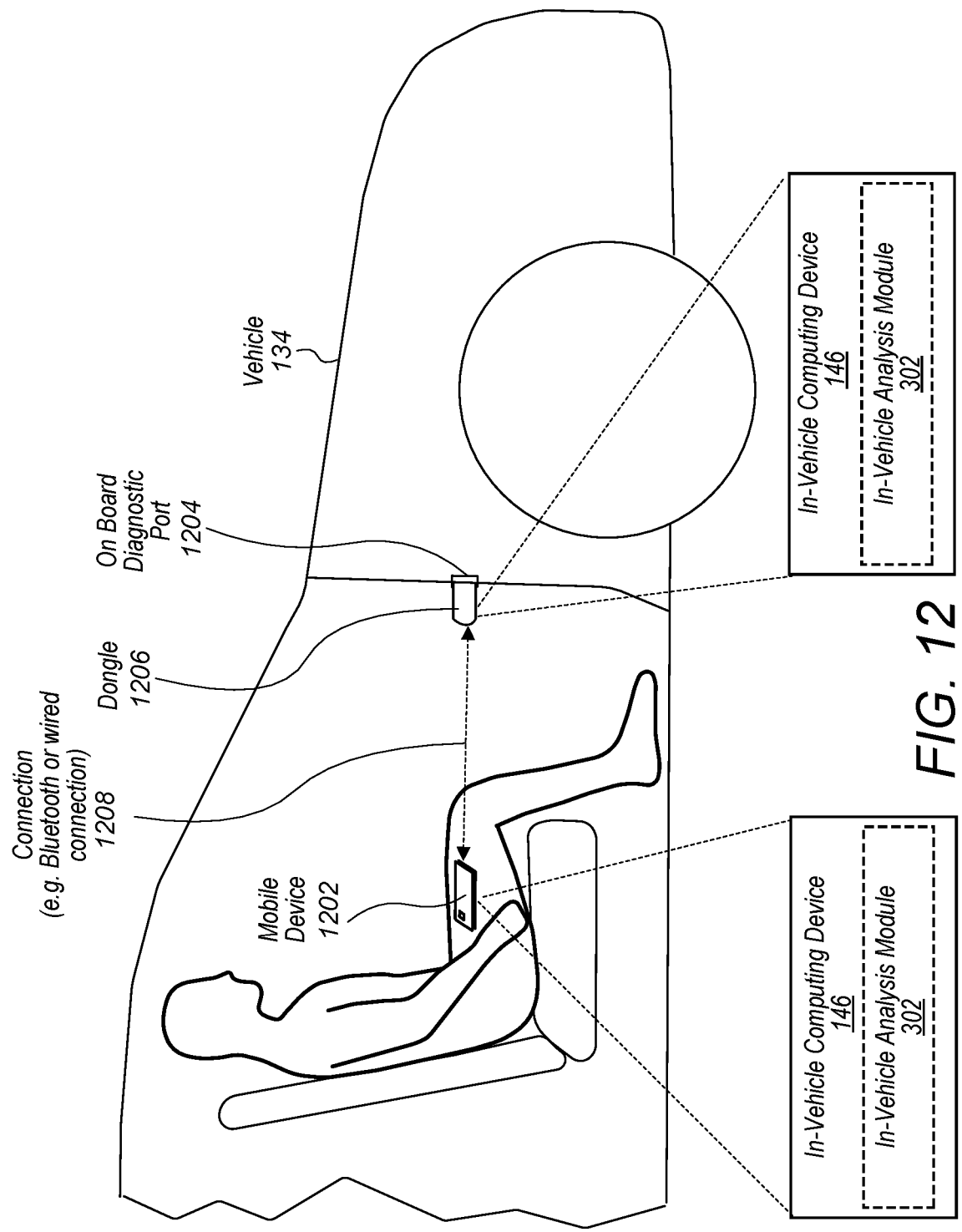

VEHICLE ANALYSIS SERVICE FOR PROVIDING LOGIC FOR LOCAL ANALYSIS AND ADDITIONAL REMOTE SUPPORT

BACKGROUND

Modern vehicles, such as cars, trucks, motorcycles, etc. are often manufactured with electronic sensors and include computer systems programmed with control algorithms that take inputs from such electronic sensors to determine various control actions to be taken for the vehicle or systems implemented in the vehicle. Some vehicles may include as many as 70 such electronic control units (ECUs) and 20-30 sensor modalities or more.

Additionally, modern vehicles increasingly include more sensors that generate more data than previous vehicles. For example, autonomous, semi-autonomous, or self-driving vehicles may include multiple cameras, radars, LIDAR sensors, audio microphones, etc. Such sensors may generate significant amounts of data, e.g. 5-10 terabytes of data per hour or more.

Also, vehicles typically include simplified interfaces for providing warnings or other information to a user of the vehicle, such as a malfunction indicator light. Such simplified interfaces typically only provide an indication of whether or not a "malfunction" is occurring. Accordingly, the user of the vehicle is often required to expend time and financial resources to bring the vehicle to a dealership or other authorized mechanic to determine a cause of the activated warning. Additionally, often times the user is required to expend even more time and financial resources coordinating with the dealership or mechanic to schedule a time for servicing the vehicle and ordering parts to resolve the issue causing the warning to be activated.

BRIEF DESCRIPTION OF THE DRAWINGS

FIG. 12 illustrates an example, implementation of an in-vehicle analysis module using a dongle inserted into an on-board diagnostic port (OBD port) of a vehicle, wherein the dongle is connected to a computing device in the vehicle, such as a user's portable phone, according to some embodiments.

Figure 1:
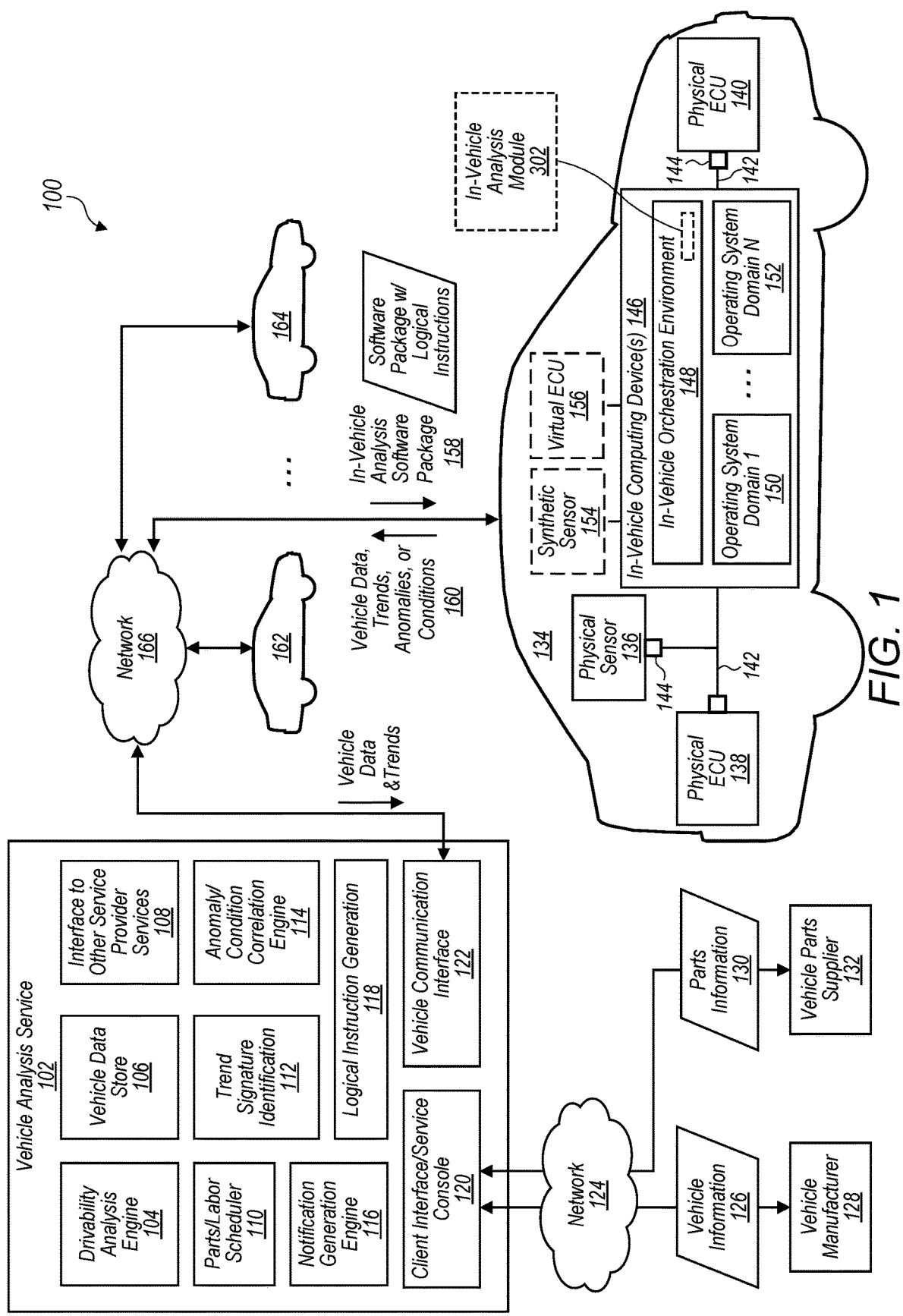
FIG. 1 illustrates a vehicle analysis service that generates logical instructions for use by a local in-vehicle analysis module executing in a vehicle or fleet of vehicles, wherein the local in-vehicle analysis module identifies trends in vehicle data and correlates the trends with vehicle conditions or anomalies that are reported to a user of the vehicle and/or a customer of the vehicle analysis service, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein include techniques for implementing a vehicle analysis service and/or implementing an in-vehicle analysis module, according to some embodiments.

In some embodiments, a vehicle analysis service is configured to receive or access vehicle data collected from a vehicle, or a set of representative vehicles similar to a vehicle, that is to be analyzed. Additionally, or alternatively, the vehicle analysis service is configured to receive or access other vehicle information, such as vehicle information provided by a vehicle manufacturer or vehicle parts supplier regarding components included in the vehicle. For example, such information may include expected operating conditions, component configurations, component communication interface identifications, proprietary definitions for decoding communications sent by vehicle components, etc. In some embodiments, vehicle data may include communications from vehicle sensors, vehicle control devices, vehicle electronic control units (ECUs), synthetic sensors, virtual ECUs, etc.

In some embodiments, a vehicle analysis service may utilize cloud resources, such as scalable computing capacity, data storage capacity, machine learning algorithms, etc. to learn trend signatures for trends occurring or likely to occur in vehicle data. Moreover, the vehicle analysis service may correlate such identified trends with one or more conditions or anomalies. For example, the vehicle analysis service may utilize statistical analysis, machine learning techniques, etc. to determine a causal relationship, or other correlative relationship, between identifiable trends in vehicle data and vehicle conditions or anomalies. In some embodiments, such conditions or anomalies may include vehicle failures, system failures that impact vehicle performance, vehicle parameters that are outside of a recommended range, use patterns of a vehicle that may lead to less than optimal performance or wear, etc. In some embodiments, some vehicle conditions or anomalies may need to be addressed immediately to ensure safe operation of the vehicle, while other vehicle conditions or anomalies may be tolerated in the short term, but may degrade performance or a lifespan of the vehicle if left unaddressed. Also, in some embodiments, an in-vehicle analysis module and/or vehicle analysis service may identify trend signatures in data indicating a use pattern of the vehicle, such as how a driver or operator of the vehicle is using or maintaining the vehicle, in addition to identifying trend signatures in vehicle performance information, such as ECU communications, sensor readings, etc.

Also, in some embodiments, aspects of a vehicle analysis service, such as learning trend signatures and learning correlations between trend signatures and vehicle conditions or anomalies may be implemented locally on a vehicle in addition to, or instead of, being implemented remotely using cloud resources. For example, some learning tasks that require a level of compute capacity within the capabilities of a computer system of the vehicle may be performed locally. Also, in some embodiments, learning tasks that are not urgent may be stored in a task queue to be completed locally at the vehicle when excess compute capacity is available, such as during off-hours when the vehicle is not in use. Inferences generated due to this learning (either performed locally at the vehicle or remotely using cloud resources) may be provided to the in-vehicle analysis module to update a trend signature library and/or correlation information used by the in-vehicle analysis module to analyze vehicle information for conditions or anomalies. In some embodiments, a vehicle analysis service (or locally performed learning) may provide updated logical instructions comprising new trend signatures and/or correlations that have been determined for a vehicle or a set of vehicles.

In some embodiments, a software package for implementing an in-vehicle analysis module may be deployed from a vehicle analysis service using a wireless connection to a network interface of a vehicle, such as may be implemented in a gateway of the vehicle. Original logical instructions may be provided to the vehicle as a software package to be executed using an in-vehicle computing device. In some embodiments, the software package may implement an in-vehicle analysis module that performs real-time monitoring of vehicle data for trend signatures included in the logical instructions. The in-vehicle analysis module may further utilize logical instructions provided by the vehicle analysis service to correlate identified trends in vehicle data with known conditions or anomalies. Furthermore, as more conditions or anomalies are discovered by the vehicle analysis service (and/or locally by the in-vehicle analysis module), the in-vehicle analysis module may be updated to store additional logical instructions for detecting the newly discovered conditions or anomalies. Also, in some embodiments, an in-vehicle analysis module may be updated with additional logical instructions comprising additional trend signatures for additional trends in vehicle data. In some embodiments, new trends, existing trends, or a combination of both may be indicated to correlate with newly discovered conditions or anomalies that are to be monitored for.

In some embodiments, a vehicle analysis service is implemented in a service provider network, such as a service provider that offers cloud-based services to customers of the service provider network. In some embodiments, customers of a vehicle analysis service may be vehicle suppliers (such as original equipment manufacturers (OEMs) and/or vehicle components suppliers (such as tier 1, tier 2, or tier 3 parts suppliers). Also, in various embodiments, the vehicle supplier or vehicle component supplier may offer vehicle health monitoring services to vehicle owners or other third parties via the vehicle analysis service. For example, an in-vehicle analysis module implemented using a software package provided by the vehicle analysis service may implement functionality in a vehicle that provides information to a user of the vehicle regarding conditions or anomalies associated with the vehicle. The in-vehicle analysis module may further enable the user of the vehicle to inquire about the conditions or anomalies, and the in-vehicle analysis module may provide answers to the queries. Additionally, the in-vehicle analysis module may coordinate with remote resources that implement the vehicle analysis service, such as cloud resources in a network of a cloud service provider, to provide more compute intensive analysis of vehicle data and/or identified trends in the vehicle data. In some embodiments, the service provider network may utilize machine learning algorithms to learn trend signatures for identifying relevant trends in vehicle data. Additionally, the service provider network may use machine learning, or other data analysis tools, to correlate identified trends with conditions or anomalies, such as failure conditions, anomalies related to loss of performance, use patterns that shorten a life of the vehicle or vehicle component, amongst various other conditions or anomalies that may be detected.

In some embodiments, a software package generated by a vehicle analysis service for deployment in a vehicle may include source code for a software agent that executes in a gateway (or other deployment destination) of the vehicle as well as a binary file used by the software agent to parse encoded bus communications. In some embodiments, a software package may be deployed to an in-vehicle execution environment that controls access to such encoded bus communications. Thus in such embodiments, the functionality of a binary file may at least partially be provided by the in-vehicle execution environment. Additionally, the software package may include a configuration file that indicates what types of vehicle information are to be monitored. A binary file or in-vehicle orchestration environment may be configured to enable a software application, deployed to a vehicle to be monitored, to access and interpret bus traffic on a bus of the vehicle, wherein the bus traffic is formatted and/or encoded using proprietary encoding formats and/or structures of the vehicle supplier or vehicle component supplier that are formatted in accordance with definitions defined in a proprietary dictionary. For example, a proprietary dictionary may include definitions for interpreting such encoding structures and formats. Also the software package or in-vehicle orchestration environment may have access to proprietary access credentials associated with the proprietary dictionary that may be required to gain access to the encoded vehicle information. As used herein, the proprietary dictionary and associated proprietary access credential files may also be referred to as a "dictionary" "bus database file", "protocol database file", "CAN DBC file", etc.

In some embodiments, a proprietary access credential file may include credentials for receiving communications from transmitters and transceivers that communicate over a bus of a vehicle. Also, in some embodiments, a proprietary dictionary file may define data structures and encoding formats used by transmitters and transceivers to communicate vehicle information over a bus of a vehicle. For example, the proprietary dictionary may define structures used to send messages over the bus, such as a bit signature used to signal a beginning of a message and/or a bit signature used to signal an end of a message. The proprietary dictionary may also include bit signatures used to encode "words" or "symbols" in a message. Additionally, the proprietary dictionary may include scales used to signal values in the message. To the extent abstraction layers are used in the formatting of the vehicle information sent via a bus of a vehicle, the proprietary dictionary may include information for interpreting the abstraction layers. The proprietary access credentials may be required to gain access to such bit signatures and encoded vehicle information that is then decoded using the proprietary dictionary.

In some embodiments, some or all of the information exchanged over a vehicle communication bus may be encrypted. In such cases, the automaker may provide the necessary decryption software and keys to understand the encrypted vehicle communication messages. For example, such decryption software and keys may be provided with the proprietary dictionary. Also, such decryption software and keys may be included in a software package to be deployed to a vehicle for use in vehicle analysis.

For example, a controller area network (CAN) bus protocol may be used to connect in-vehicle electronic control units (ECUs) with one another and exchange real-time, critical information with speeds up to 1 Mbps over a CAN bus. The CAN specification describes the physical and data link layers for high speed in-vehicle communication. Vehicle suppliers and vehicle component suppliers use the CAN bus protocol to enable time critical, low bandwidth operations. One of the key principles behind the CAN bus protocol is that each vehicle supplier/vehicle component supplier can define a proprietary CAN bus encoding that identifies every car ECU (control bits) and data to be communicated (payload of 64 bits with custom offsets and scales per parameter) in a unique manner. This allows the vehicle supplier/vehicle component supplier to protect the communication handshakes between ECUs. However, by design the CAN bus communication protocol is based on multicasting, which means that any compute device can monitor all traffic with the right decoding database (e.g. proprietary dictionary and proprietary access credentials) if attached to the same physical interface. Within a single car there may be several CAN buses, some of them made for higher speeds such as the CAN-FD (CAN with Flexible Data Rate) that can reach speeds of up to 6 Mbps. In some embodiments, a dictionary file may include a CAN DBC file. Also a vehicle may include other buses, such as an Ethernet or IP bus, a local interconnect (LIN) bus, a Flex Ray bus, a time-triggered protocol (TTP) bus, etc. In some embodiments, different respective proprietary dictionaries may define protocols used by the different types of buses and may be made accessible to a vehicle analysis service to generate binary files for monitoring vehicle information encoded using the respective bus protocols.

In some embodiments, the vehicle information communicated over a bus of a vehicle may be formatted in binary form. In some embodiments, the binary files used to decode the binary information may be used to convert the binary data into standardized formats, such as JSON/XML formats that can be used with downstream applications.

In some embodiments, a vehicle analysis service may support various vehicle diagnostic standards, such as the Unified Diagnostic Service (UDS) ISO 14229 standard, the Diagnostics over IP (DoIP) ISO 13400 standard, the Open Diagnostics eXchange (ODX) ISO 22901 standard, the Open Test sequence eXchange format (OTX) ISO 13209, the Modular Vehicle Communication Interface (MVCI) ISO 22900.

In some embodiments, a system includes one or more computers configured to implement a vehicle analysis service. The one or more computers that implement the vehicle analysis service are configured to receive vehicle information for a vehicle, or a fleet of vehicles, wherein the received vehicle information includes vehicle data for the vehicle or the fleet of vehicles or information about components of the vehicle or the fleet of vehicles that generate vehicle data. The one or more computers that implement the vehicle analysis service are further configured to determine, based on the vehicle information, trend signatures for use in identifying trends in vehicle data generated by the components of the vehicle or the fleet of vehicles, correlate the one or more of the trends in the vehicle data with a condition or anomaly of the vehicle or the fleet of vehicles, and generate logical instructions to be provided for deployment to the vehicle or the fleet of vehicles. The logical instructions include instructions for detecting the trends in the vehicle data based on the determined trend signatures and instructions for correlating one or more of the detected trends with the condition or anomaly of the vehicle or the fleet of vehicles. Additionally, the one or more computers that implement the vehicle analysis service are further configured to provide the logical instructions for deployment to the vehicle or the fleet of vehicles.

In some embodiments, a system includes a computing device located in a vehicle, wherein the computing device is configured to receive a software package from a vehicle analysis service, the software package comprising logical instructions for identifying a condition or anomaly affecting the vehicle based on trends in vehicle data generated by components of the vehicle and execute the logical instructions to implement a local vehicle analysis module. The local vehicle analysis module is configured to access vehicle data communicated from components of the vehicle, identify one or more trends in the vehicle data based on trend signatures included in the logical instructions, determine the condition or anomaly affecting the vehicle based on one or more correlations indicated in the logical instructions, wherein the one or more correlations correlate the one or more trends with the condition or anomaly affecting the vehicle, and provide an indication of the determined condition or anomaly affecting the vehicle to a user of the vehicle.

In some embodiments, a method includes receiving logical instructions, identifying one or more trends in vehicle data based on trend signatures included in the logical instructions, correlating the one or more trends in the vehicle data with a condition or anomaly affecting the vehicle, wherein the logical instructions comprise instructions for performing the correlating of the one or more trends with the condition or anomaly affecting the vehicle, and providing a user of the vehicle an indication of the determined condition or anomaly affecting the vehicle.

FIG. 1 illustrates a vehicle analysis service that generates logical instructions for use by a local in-vehicle analysis module executing in a vehicle or fleet of vehicles, wherein the local in-vehicle analysis module identifies trends in vehicle data and correlates the trends with vehicle conditions or anomalies that are reported to a user of the vehicle and/or a customer of the vehicle analysis service, according to some embodiments.

Vehicle analysis service 102 includes drivability analysis engine 104, vehicle data store 106, interface to other service provider services 108, parts/labor scheduler 110, trend signature identification module 112, anomaly/condition correlation engine 114, notification generation engine 116, logical instruction generation 118, client interface/service console 120, and vehicle communication interface 122.

Vehicle analysis service 102 may be connected to customers, such as vehicle manufacturer 128 and vehicle parts supplier 132, via network 124, which may be a public network, such as the internet, or which may be a private network connection. The customers (e.g. vehicle manufacturer 128 and vehicle parts supplier 132) may provide vehicle information 126 or parts information 130, such as a proprietary dictionary for access to vehicle communications and/or may provide other information or credentials for accessing vehicle communications. Additionally, the customers (e.g. vehicle manufacturer 128 and vehicle parts supplier 132) may provide access to collected vehicle data, such as may be stored in a data lake or other type of data storage on behalf of the customers. Also, in some embodiments, the customers may provide access to other types of vehicle information, such as engineering specifications, component configuration diagrams, component specifications and normal operating ranges, etc. The vehicle information provided by the customers may be used to determine trend signatures and correlations between trends in vehicle data and observable vehicle conditions or anomalies.

In some embodiments the customers (e.g. vehicle manufacturer 128 and vehicle parts supplier 132) may provide the vehicle information to the vehicle analysis service 102 via the customer interface/service console 120. The provided vehicle information may then be stored in vehicle data storage 106. The trend signature identification module 112 may utilize machine learning algorithms and/or other statistical analysis to identify trends signatures in the vehicle data that correlate with vehicle conditions or anomalies. In some embodiments, anomaly/condition correlation engine may work in conjunction with trend signature identification module 112 to determine correlations between the identified trends and vehicle conditions or anomalies. In some embodiments, both trend signature module 112 and anomaly/condition correlation engine may utilize machine learning algorithms to identify trends and correlate the identified trends with insights into vehicle conditions or anomalies that are related to the trends. Moreover, in some embodiments, interface to other service provider services 108 may coordinate with a machine learning service or artificial intelligence service of a service provider network hosting the vehicle analysis service 102, wherein machine learning tasks are offloaded to the machine learning service of the service provider network from trend signature identification module 112 and/or anomaly/condition correlation engine 114. Also in some embodiments, in addition to, or instead of, receiving vehicle information from customers 128 and 132, the vehicle analysis service may receive vehicle information directly from the vehicle(s) (e.g. vehicle 134, 162, 164, etc.).

The trend signatures identified by trend signature identification module 112 and the correlations determined by anomaly/condition correlation engine 114 may be provided to logical instruction generation module 118 to be included in logical instructions of a software package that is to be deployed to a vehicle or fleet of vehicles that are provided analysis support from the vehicle analysis service 102. For example, in-vehicle analysis software package 158 may be deployed from vehicle communication interface 122 and provided to vehicles 134, 162, and 164, etc. via network 166.

In some embodiments, logical instructions included in a software package 158 may be executed in various environments in (or associated with) the vehicle to implement an in-vehicle analysis module. For example, in some embodiments, the in-vehicle analysis module may be implemented in an in-vehicle orchestration environment 148 of the in-vehicle computing device(s) 146 that has access to various vehicle domains, such as operating system 1 domain (150) through operating system domain N (152). Also the in-vehicle orchestration environment may be connected to one or more communication buses of the vehicle, such as bus 142. Various vehicle components, may be connected to bus 142 via bus interfaces 144 and may transmit encoded communications via the bus 142. For example, physical ECU 138 and physical ECU 140 may communicate with one another and receive vehicle information from physical sensor 136 via bus 142. In some embodiments, any such vehicle information communicated over bus 142 may be monitored by vehicle analysis module 302 to detect trend signatures in the vehicle information and to correlate identified trends with one or more vehicle anomalies or conditions.

In some embodiments, an in-vehicle orchestration environment may further implement a synthetic sensor, wherein the synthetic sensor appears to other components of the vehicle as a sensor coupled to the bus 142. The in-vehicle orchestration environment may control access for the synthetic sensor to receive vehicle information communicated over the bus 142, and the synthetic sensor may execute program instructions to determine output data based on the received input data. For example, in some embodiments an in-vehicle analysis module may be implemented as a synthetic sensor that receives inputs from various other sensors or ECUs of the vehicle and that outputs information or notifications to a user interface of a vehicle, such as voice controlled user interface, display user interface (e.g. touchpad), SMS message, email message, etc.

Figure 11:
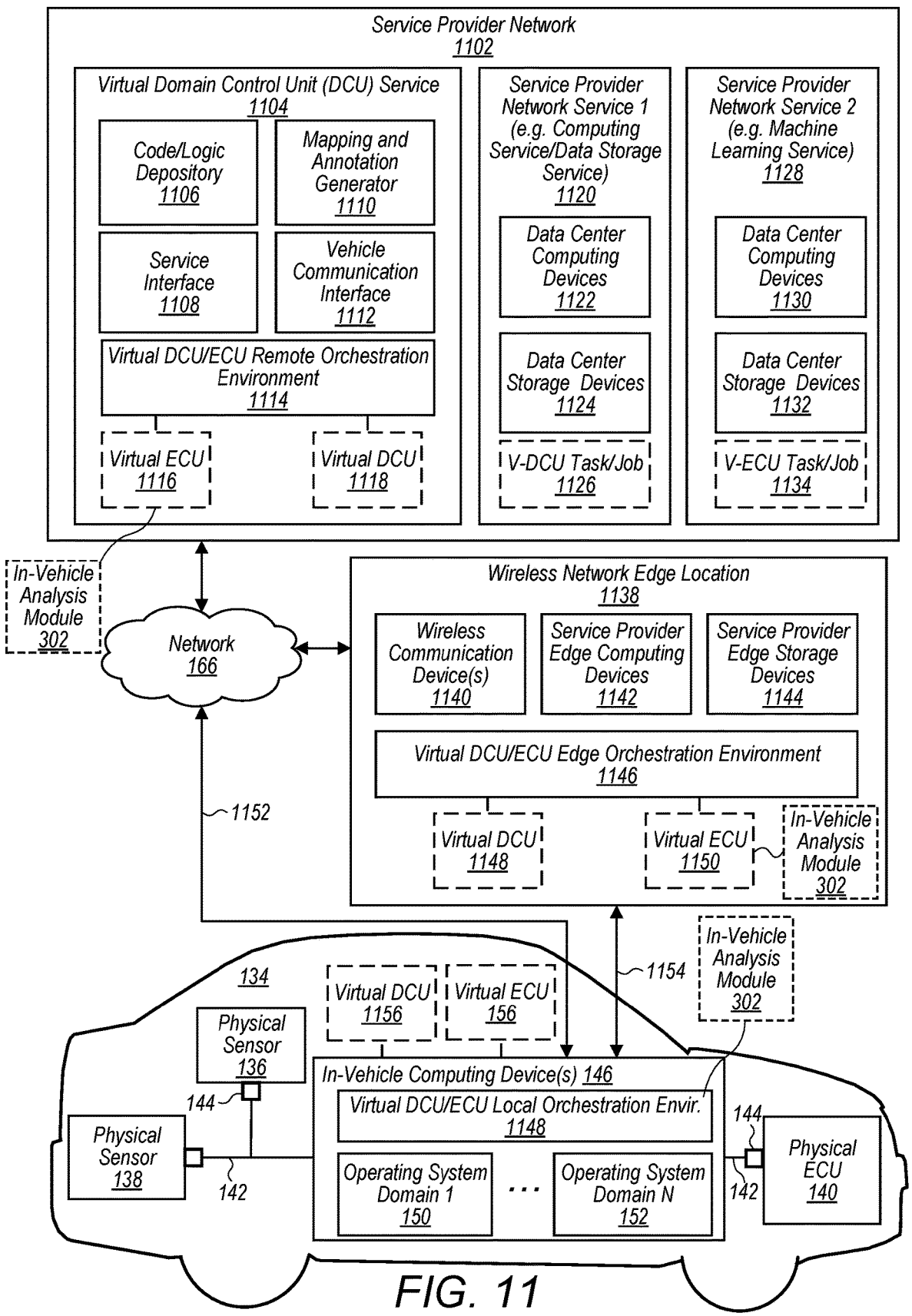
FIG. 11 illustrates an example virtual electronic control unit (virtual ECU) service that may be used to provide a virtual ECU that implements an in-vehicle analysis module, according to some embodiments.

Also, in some embodiments, an in-vehicle analysis module may be implemented using a virtual ECU that appears to the vehicle like a physical ECU but that is actually implemented using edge or cloud resources, as further explained in FIG. 11.

Furthermore, in some embodiments, an in-vehicle analysis module may be implemented using a portable computing device of a user of the vehicle that is communication with a dongle connected to an on-board diagnostics (OBD) port of the vehicle, such as further described in FIG. 12. For example, in some embodiments an in-vehicle computing device 146 that implements in-vehicle analysis module 302 may be a computing device included in a dongle connected to the OBD port of the vehicle, or a computing device, such as may be included in a mobile phone that is connected (e.g. via Bluetooth or other wired or wireless connection) to a dongle connected to the OBD port.

Also, in some embodiments, an in-vehicle analysis module may provide vehicle data, trends, anomalies, and/or conditions 160 back to the vehicle analysis service 102 via vehicle communications interface 122. The provided vehicle data, trends, anomalies, and/or conditions 160 may be stored in vehicle data store 106 and may be used by trend signature identification module 112 and anomaly/condition correlation engine 114 to identify new trend signatures and/or new correlations that may then be provided back to in-vehicle analysis module 302 as a software update.

In some embodiments, notification generation engine 116, may issue one or more notifications in response to a given condition or anomaly being detected in vehicle 134. For example, the notification generation engine 116 may alert vehicle manufacturer 128 to a potential warranty issue. As another example, the notification generation engine 116 may provide a user of the vehicle one or more recommendations on how to change use patterns to improve performance or longevity of the vehicle. In embodiments, in which vehicle analysis service 102 is used for fleet vehicle analysis, the notification generation engine may provide recommendations to a fleet operator, for example on how to change use patterns or maintenance patterns for vehicles of the fleet in order to improve performance or vehicle life.

Also, in some embodiments, parts/labor scheduler 110 may coordinate scheduling a mechanic and/or ordering parts to resolve a condition or anomaly detected in vehicle 134 via an in-vehicle analysis module 302 executing in in-vehicle orchestration environment 148 (or executing in other environments as described herein).

In some embodiments, drivability analysis engine 104 may further utilize identified vehicle data trends and correlations to determine whether or not it is safe to continue to operate vehicle 134 with the detected condition or anomaly. Drivability analysis engine 104 may further determine conditions or limitations on how vehicle 134 should be used while the condition or anomaly is occurring in vehicle 134. For example, drivability analysis engine may determine the vehicle is not to be operated over a given speed, or for more than a given amount of time. The drivability analysis engine 104 may provide such results to the client interface/service console 120 and/or the vehicle communication interface 122 for communication to a customer and/or user of the vehicle. In some embodiments, drivability analysis engine 104 may further identify trends in use data for the vehicle indicating how the user of the vehicle is likely to operate the vehicle. These trends may further be correlated with the determined conditions or anomalies to determine/select recommendations to be provided to the user with regard to drivability of the vehicle. For example use data indicating that a current user of the vehicle follows posted speed limits may result in a different drivability recommendation being provided to the user than may be provided to a second user for which user data indicates that the second user frequently exceeds posted speed limits. Thus, for a given mechanical condition or anomaly occurring in the vehicle, drivability analysis engine 104 may provide different drivability instructions based on different trend signatures indicating different trends in use data for different users of the vehicle.

Figure 2A:
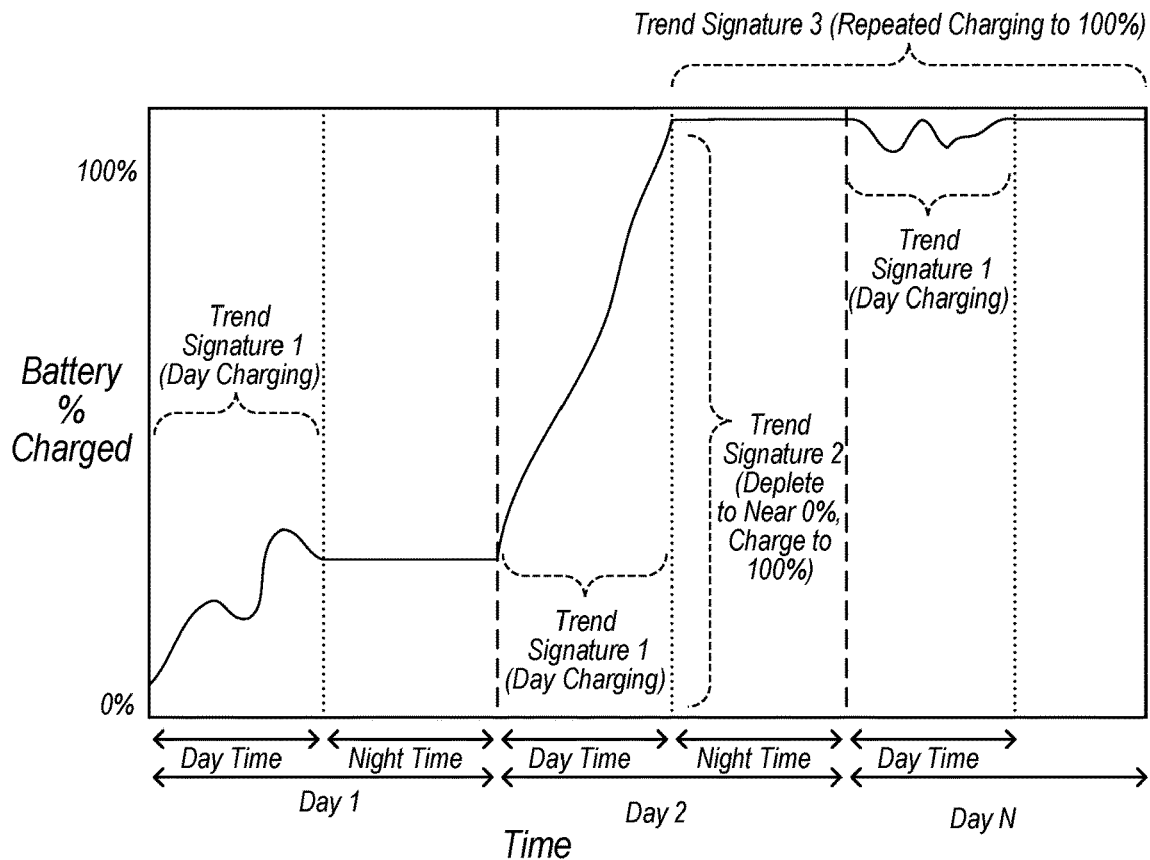
FIGS. 2A-2B illustrates example trend signatures that may be identified by an in-vehicle analysis module and that may be correlated by the in-vehicle analysis module with a vehicle condition or anomaly occurring in the vehicle, according to some embodiments.
Figure 2B:
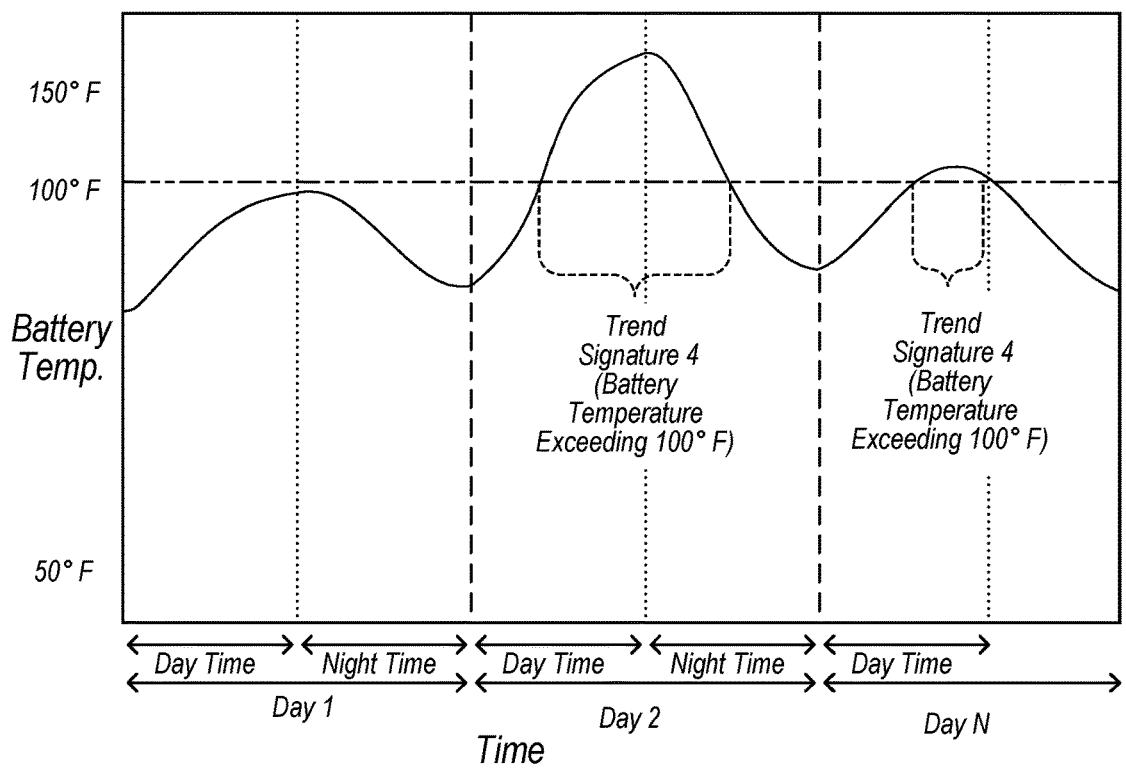

FIGS. 2A-2B illustrates example trend signatures that may be identified by an in-vehicle analysis module and that may be correlated by the in-vehicle analysis module with a vehicle condition or anomaly occurring in a vehicle, according to some embodiments.

As an example, FIG. 2A illustrates a graph of battery charge level versus time. As can be seen during day 1, the battery is charged from near zero percentage charge to roughly 30% charge during the daytime hours of day 1. During the night time hours of day 1, the battery is not charged and is not depleted. Then during the daytime hours of day 2, the battery is charged to nearly 100% charge and is not charged during the night time hours of day 2. Then during day N the battery is depleted and repeatedly charged back to 100% during the daytime hours of day N, but is not charged during the night time hours of day N. As can also be seen in FIG. 2B, the battery temperature increases to a high temperature, such as above 100° F., for a considerable portion of day 2 when the battery is being charged from a low charge to a full charge during the daytime hours. Also, when the battery is charged during the daytime hours of day N the battery temperature exceeds the high temperature, e.g. 100° F.

As an example, logical instructions included in an in-vehicle analysis software package 158 may include trend signatures identified by trend signature identification module 112 and anomaly/condition correlation module 114 that identify usage trends that correlate with sub-optimal battery life. For example, causing the battery to reach a high temperature may reduce battery life or performance. Also, repeatedly charging the battery to 100% may further be correlated with negative effects on battery life. Furthermore, fully draining and fully charging the battery an excessive number of times may be correlated with decreased battery life. (Note these are only given as example correlations, in some embodiments other correlations may be determined for battery life, or for any other component of the vehicle.)

Continuing the example, in-vehicle analysis module 302 may store logical instructions for identifying trend signature 1 corresponding to daytime charging. Also, in-vehicle analysis module 302 may store logical instructions for identifying trend signature 2 corresponding to cycling the battery between zero charge and a full charge and trend signature 3 corresponding to repeatedly charging the battery to full charge. Furthermore, in-vehicle analysis module 302 may store logical instructions for identifying trend signature 4 corresponding to the battery temperature exceeding a threshold temperature for more than a threshold amount of time. Additionally, the in-vehicle analysis module 302 may store logical instructions that correlate trend signatures 1 through 4 with sub-optimal battery performance and/or shortened battery life.

In response to identifying trend signatures 1 through 4 are present in monitored vehicle data, the in-vehicle analysis module 302 may further correlate these trend signatures/ trends with sub-optimal battery usage patterns and provide an indication of the detected anomaly or condition to a customer of the vehicle analysis module, such as a user of the vehicle or a fleet operator of a fleet. In some embodiments, the in-vehicle analysis module may further provide recommendations to a user to improve use of the vehicle, such as by charging the vehicle at night. Also, in some embodiments, use data about how the user uses the vehicle may be examined for trend signatures, such as that the user does not vehicle charge the vehicle at home. In such embodiments, a recommendation may further be customized based on trend signatures and correlations in use data, such as an inference that the user of the vehicle does not have a home charging station. Thus, the recommendation may include a suggestion to install a home charging station. For example, FIG. 3 provides additional details regarding how an in-vehicle analysis module 302 may respond to a detected anomaly or condition in a vehicle, according to some embodiments.

Figure 3A:
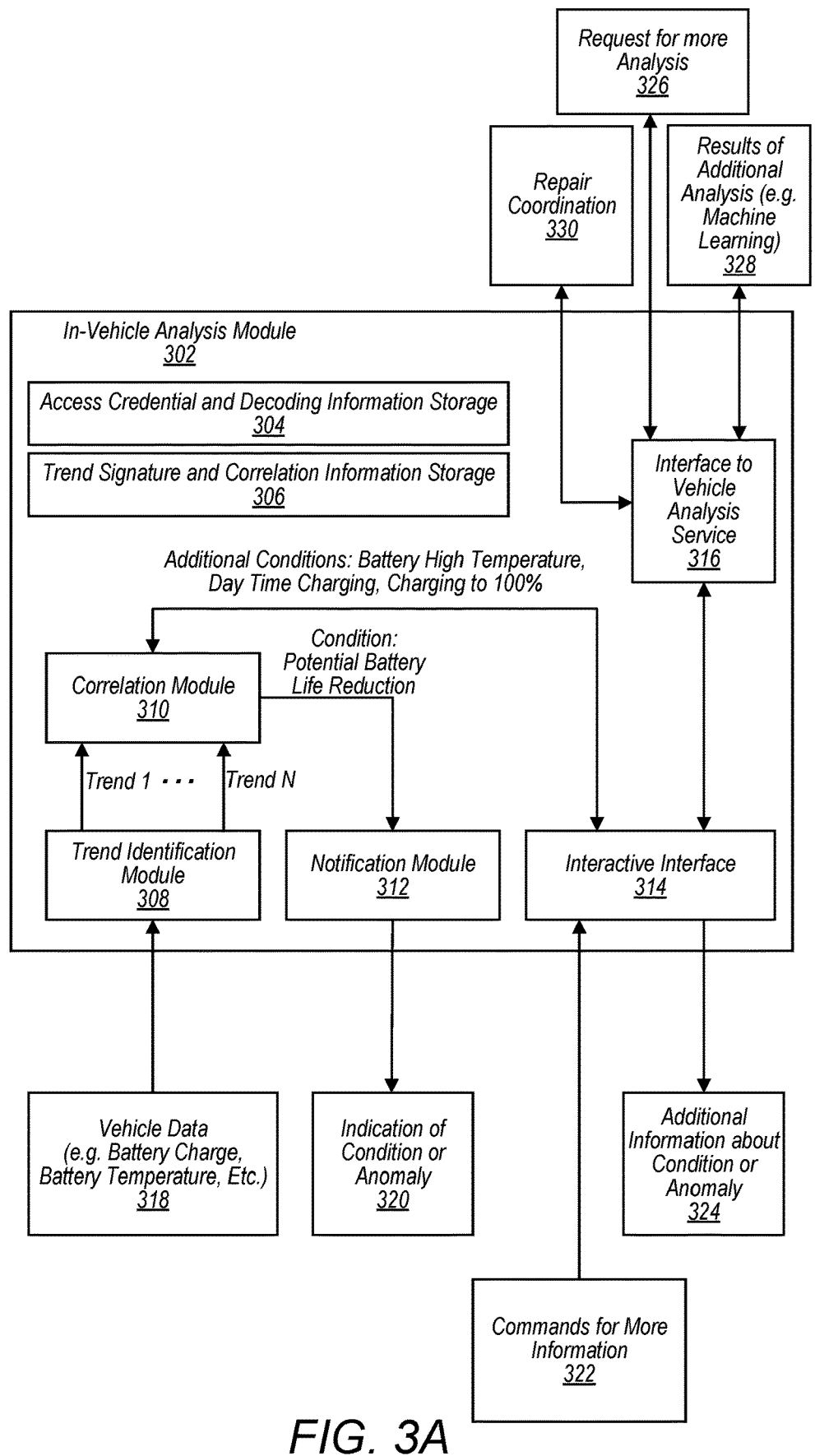
FIG. 3A illustrates example components of an in-vehicle analysis module, wherein the in-vehicle analysis module receives vehicle data and commands from a user of the vehicle and provides an indication of an anomaly or other conditions occurring in the vehicle. The in-vehicle analysis module also provides follow-up information about the anomaly or condition. Additionally, the in-vehicle analysis module may further coordinate with a vehicle analysis service to request more in-depth analysis or coordinate follow-up items for resolving the condition or anomaly, according to some embodiments.

FIG. 3A illustrates example components of an in-vehicle analysis module, wherein the in-vehicle analysis module receives vehicle data and commands from a user of the vehicle and provides an indication of an anomaly or other conditions occurring in the vehicle. The in-vehicle analysis module also provides follow-up information about the anomaly or condition. Additionally, the in-vehicle analysis module may further coordinate with a vehicle analysis service to request more in-depth analysis or coordinate follow-up items for resolving the condition or anomaly, according to some embodiments.

In-vehicle analysis module 302 may be a same or similar in-vehicle analysis module as in-vehicle analysis module 302 implemented in in-vehicle orchestration environment 148 in response to receiving software package 158 from vehicle analysis service 102, as illustrated in FIG. 1.

In-vehicle analysis module 302 includes access credential and decoding information storage 304, trend signature and correlation information storage 306, trend identification module 308, correlation module 310, notification module 312, interactive interface 314, and interface 316 to the vehicle analysis service. In some embodiments, access credential and decoding information storage 304 stores decoding information and access credentials for accessing and deciphering encoded communications communicated over a bus of a vehicle. In some embodiments, access credentials and decoding information may be maintained outside of the in-vehicle analysis module, such as in an in-vehicle orchestration environment, wherein the in-vehicle orchestration environment coordinates providing credentials to access vehicle information communicated over a bus of the vehicle and/or further decodes the vehicle information and provides decoded vehicle information to the in-vehicle analysis module for further analysis.

In some embodiments, trend signature and correlation information storage 306 stores trend signatures and correlation information that has been determined by a vehicle analysis service, such as vehicle analysis service 102, and that has been provided to the in-vehicle analysis module, for example in a software package 158, or a subsequent update.

Trend identification module 308 receives vehicle data 318, such as vehicle data representing battery charge and battery temperature as shown in FIGS. 2A and 2B. While, not shown, trend identification module 308 may additionally receive use data indicating how a given user is using the vehicle or how the vehicle is being maintained. Trend identification module 308 identifies trends in the vehicle data 318 (and/or use data) based on matching trend signatures to the vehicle data (and/or use data). For example, a trend signature 1 may take the form of a battery charge percent increasing between 8:00 am and 5:00 μm and not increasing between 10:00 μm and 5:00 am. This trend signature may identify a "daytime charging" trend. In such a circumstance, trend identification module 308 may recognize the trend signature (e.g. charge increasing between 8:00 am and 5:00 μm and not increasing from 10:00 μm to 5:00 am) in vehicle data indicating battery charge and may determine the "daytime charging" trend is present in the vehicle data. This may be one of trends 1 through trends N that are determined and provided to correlation module 310. As another example, trend identification module 308 may determine other trends are present in the vehicle data, such as depleting to near 0% and charging to near 100% (e.g. trend 2 shown in FIG. 2A), repeated charging to 100% (e.g. trend 3 shown in FIG. 2A), and battery temperature exceeding a high temperature threshold (e.g. trend 4 shown in FIG. 2B). The correlation module 310 may correlate these identified trends, based on correlation information stored in trend signature and correlation information storage 306, with a use history that leads to shortened battery life. In response, the correlation module 310 may cause notification module 312 to issue a notification 320 indicating the determined condition or anomaly, e.g. use history that leads to shortened battery life. For example, this may indicate that the vehicle is being charged while at work using a charger at a place of employment, but is not being charge at home. This may be due to the owner or user of the vehicle not having a charger installed at their home.

As another example, trend identification module 308 may match trend signature 2 to the received vehicle data, wherein trend signature 2 is defined as a daily charge variation of over 90%. Note that this trend in isolation may not be worthy of providing a notification to the user or customer, because the user may have taken the vehicle on a long trip. However, when combined with trend signatures 1, 3, and 4 the correlated trends may justify providing the notification to the user or customer.

Continuing the example, correlation module 310 may correlate trends 1 through 4 with sub-optimal charging habits that may reduce the life of the battery of the vehicle. In response, correlation module 310 may cause notification module 312 to issue an indication of the condition (320) to the customer of the vehicle analysis module or the user of the vehicle. For example, a notification may be provided to a fleet operator, vehicle manufacturer, vehicle user, etc.

The customer or user may further issue a command (322), for example via a user interface of the vehicle, inquiring for more information related to the potential shortened battery life condition to interactive interface 314. In response, interactive interface may provide the customer or user with additional information related to the condition, such as the trend of daytime charging, the trend of charging the battery all the way to 100%, and the high temperature of the battery. Also, in some embodiments, a query for more information may be submitted to a vehicle analysis service, which may retrieve the additional information from the in-vehicle analysis module 302.

Additionally or alternatively, interactive interface 314 may forward the customer query to interface 316, which is an interface to the vehicle analysis service. This interface 316 may forward the query to vehicle analysis service 102 for more detailed analysis or analysis using more powerful computing resources. For example, a request for more analysis 326 may be sent to a machine learning algorithm to provide recommendations, such as to park the vehicle in a shaded location when charging, install a charging station at home to avoid daytime charging, etc. The results (328) may be returned to the interface 316 and further forwarded to the interactive interface 314 for presentment to the customer or user as additional information about the condition or anomaly 324. Also, the results of the additional analysis may be presented to a customer of the vehicle analysis service via an interface of the service, such as client interface/service console 120.

Figure 3B:
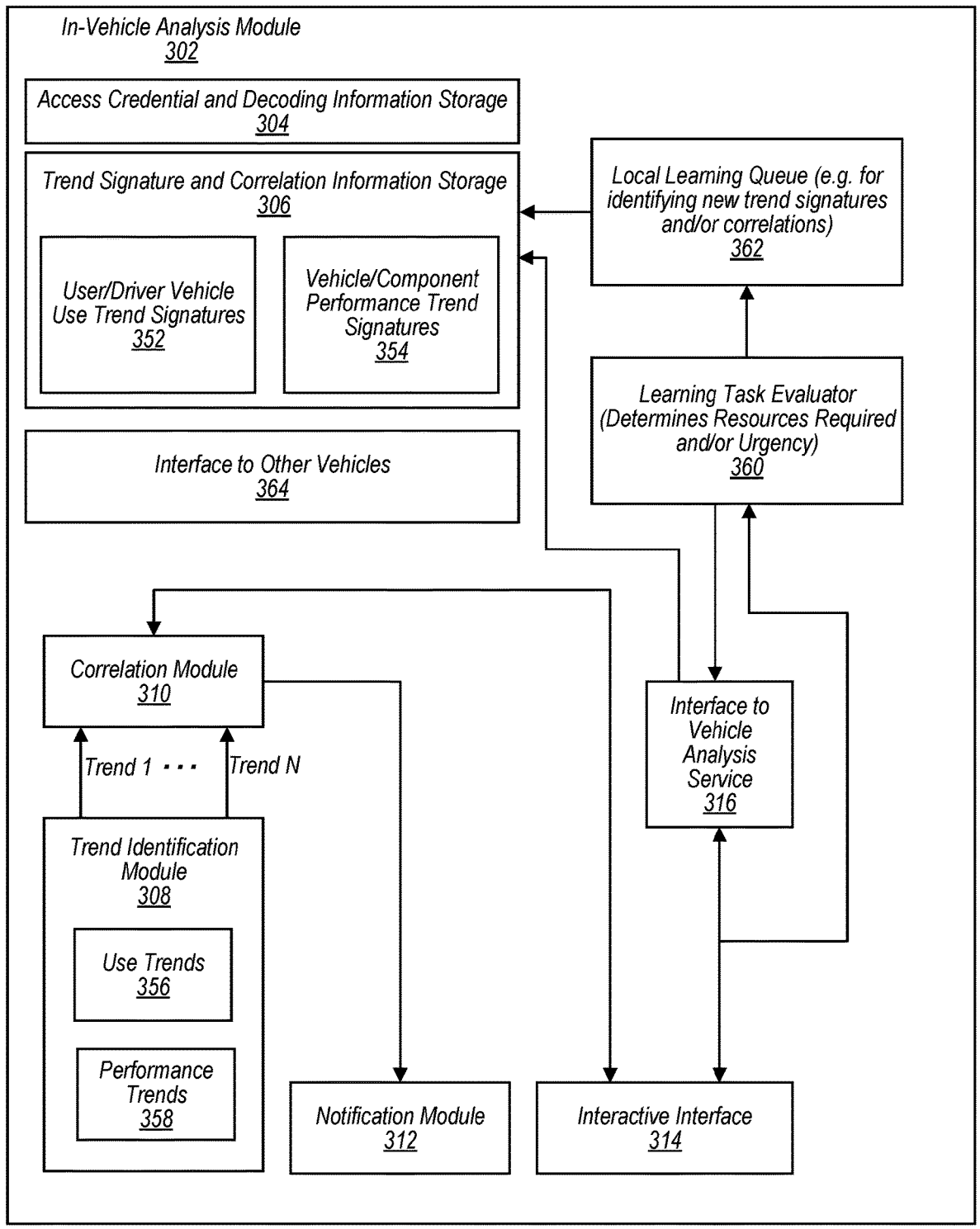
FIG. 3B illustrates additional components that may be included in an in-vehicle analysis module, according to some embodiments.

In some embodiments, an in-vehicle analysis module 302 may include additional components as shown in FIG. 3B. For example, in some embodiments, in-vehicle analysis module 302 may further store user/driver vehicle use trend signatures 352 and vehicle/component trend signatures 354 in trend signature and correlation information storage 306. Additionally, in some embodiments, trend identification module 308 may include a use trends identification component 356 and a performance trends identification component 358. For example, use trends identification component 356 may apply user/driver vehicle use trend signatures 352 to use data to identify use trends. Also, performance identification trends component 358, may apply vehicle component performance trend signatures to vehicle information, such as may be collected from ECUs, sensors, etc. of the vehicle, to determine performance trends for the vehicle or components of the vehicle.

Additionally, in some embodiments, in-vehicle analysis module 302 may include an interface 364 to other vehicles. For example, in some embodiments, information from other vehicles may also be used by trend identification module 308 to identify trends in the vehicle information from the other vehicles. Also, in some embodiments, updates in regard to trend signatures and/or correlation information may be shared between vehicles via interface 364. For example, in some embodiments, newly determined trend signatures and/or correlation information may be distributed between vehicles without necessarily having to be uploaded to a remote service, such as in-vehicle analysis service 102.

Also, in some embodiments, at least some learning of new trend signatures and/or new correlations may be performed locally at a vehicle in addition to, or instead of, being performed remotely, such as at a remote site implementing in-vehicle analysis service 102. Also, as described in more detail in FIG. 11, in some embodiments, virtual ECUs implemented in an edge domain may be used to perform semi-local learning. For example, in some embodiments, requests for additional insight received at interactive interface 314 may be additionally, or alternatively, routed to learning task evaluator 360 of the in-vehicle analysis module 302 (in addition to or instead of being routed to in-vehicle analysis service 102 via interface 316). The learning task evaluator 360 may determine an urgency of the learning task and/or an amount of resources or data access required to perform the learning task. Based on this analysis, the learning task evaluator 360 may refer the learning task to in-vehicle analysis service 102 via interface 316 or may refer the task to local learning queue 362.

In some embodiments, local compute resources of a vehicle may be used to perform learning for tasks in local-learning queue 362. For example, when a vehicle is not in use, compute capacity of the vehicle may be used to identify new trend signatures and/or correlations. These updates may further be provided to trend signature and correlation information storage 306 for use in identifying trends and correlations when the vehicle is next used. Also, results of learning tasks routed to vehicle analysis service 102 may be provided to trend signature and correlation information storage 306 via interface 316, for use in identifying new trends and/or correlations.

Figure 4A:
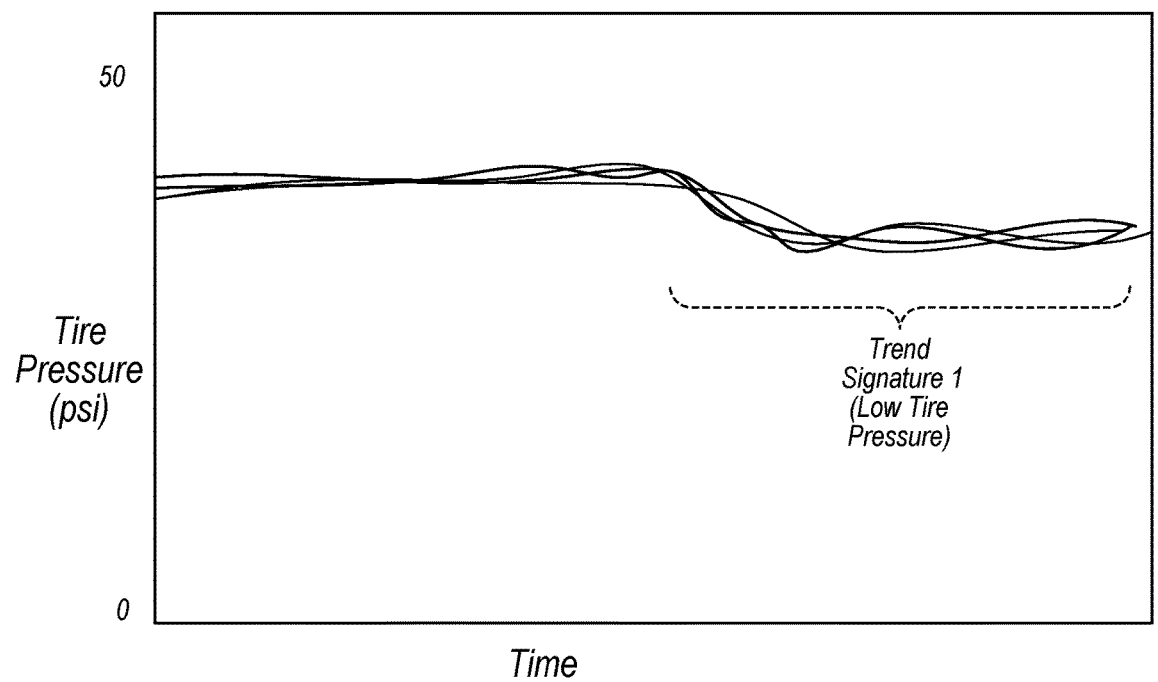
FIGS. 4A-4B illustrate additional example trend signatures that may be identified by an in-vehicle analysis module and that may be correlated by the in-vehicle analysis module with a vehicle condition or anomaly, according to some embodiments.
Figure 4B:
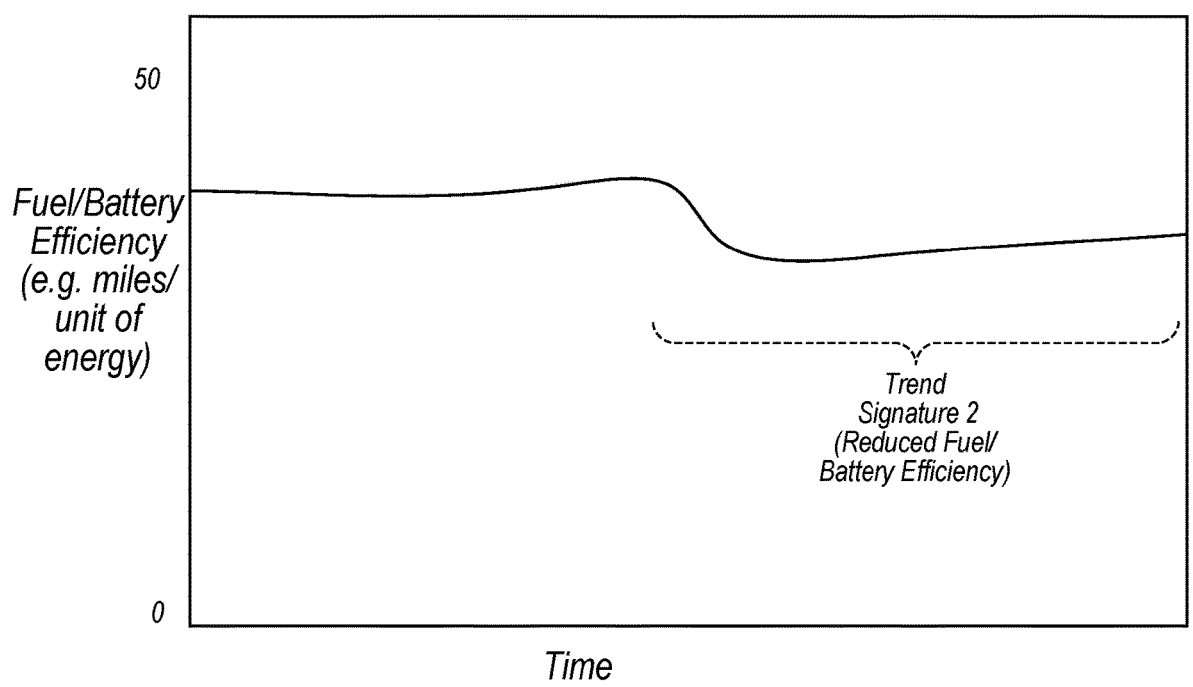

FIGS. 4A-4B illustrate additional example trend signatures that may be identified by an in-vehicle analysis module and that may be correlated by the in-vehicle analysis module with a vehicle condition or anomaly, according to some embodiments.

In some embodiments, a trend signature may include a pattern in one or more sensor measurements or ECU outputs over time. In some embodiments, trend signatures may be defined in various ways. For example, a shape of graphed data may be used to define a trend signature. Also, in some embodiments, threshold values, amounts of change (e.g. displacement), rates of change (e.g. velocity of changes), and acceleration of changes in outputs for one or more vehicle components, such as ECUs or sensors, may be used to define a trend signature. In some embodiments, changes or patterns in vehicle data for one or more components may further be combined with other data, such as time of day or ambient weather conditions, to form a trend signature. In some embodiments, various other statistical analysis may be used to define a trend signature, such as a standard deviation more than X amount, a bivariate correlation between variables closer than a given amount, etc.

As another example trend signature, a change in tire pressure over time that has a displacement of change of more than 15 psi, or that exceeds a threshold pressure, e.g. less than 30 psi may define a trend signature for a low tire pressure, e.g. trend signature 1 shown in FIG. 4A. However, if the acceleration of change or velocity of change of the tire pressure were to be greater than a second threshold value, such as 10 psi per minute, the change in tire pressure may correspond to a different trend signature, such as a trend signature indicating a leaking/popped tire. Additionally, other vehicle data may be used in a trend signature to disambiguate between partially overlapping trends. For example, vehicle fuel/battery efficiency may be combined with tire pressure data. As an example, trend signature 1 combined with trend signature 2 (e.g. marginal loss of fuel/battery efficiency) and rates of tire pressure change that do not meet a threshold for a leaked/popped tire trend may be use used together (e.g. correlated) to determine a low tire pressure issue is affecting fuel/battery efficiency, but the tire is likely not popped.

Figure 5A:
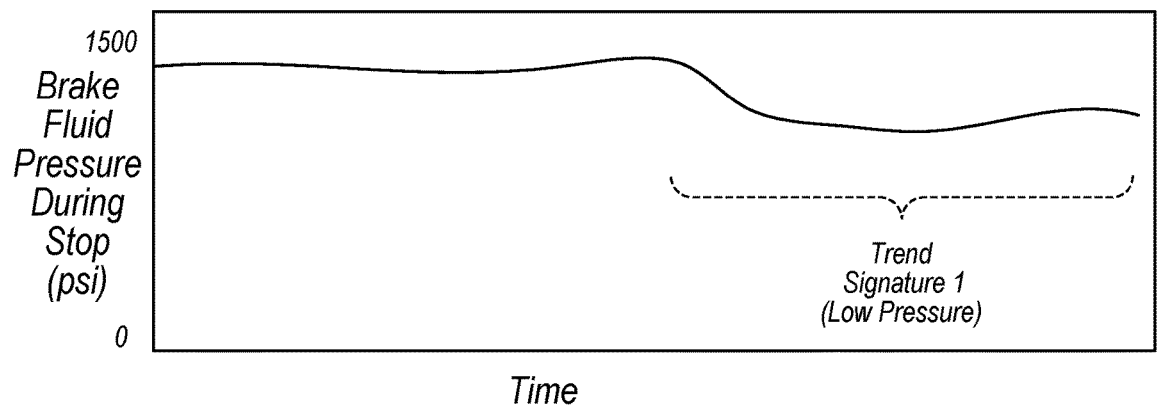
FIGS. 5A-5C illustrate other example trend signatures that may be identified by an in-vehicle analysis module and that may be correlated by the in-vehicle analysis module with a vehicle condition or anomaly, according to some embodiments.
Figure 5B:
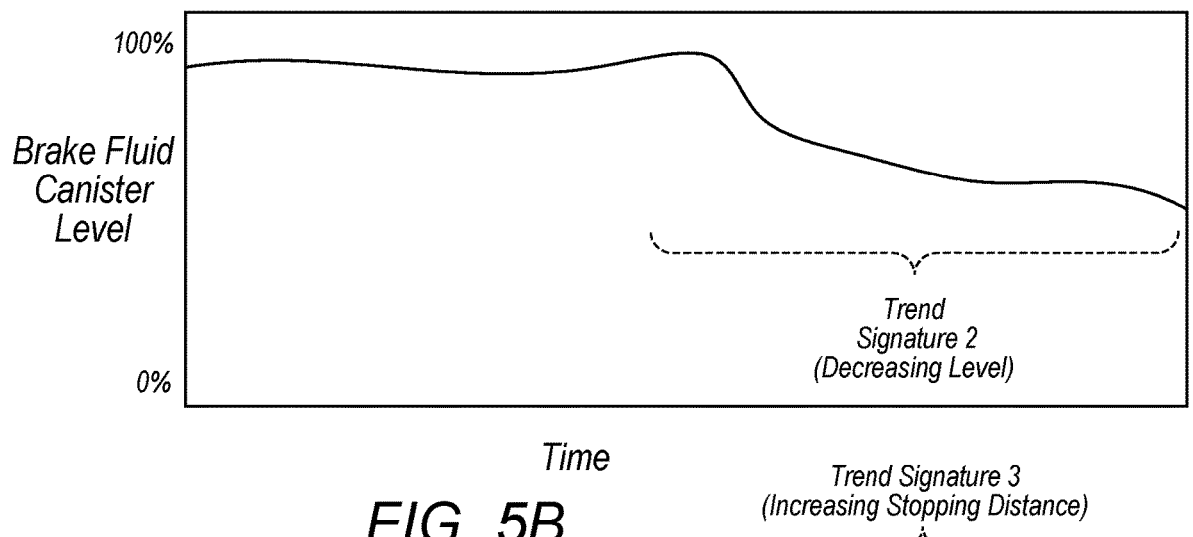
Figure 5C:
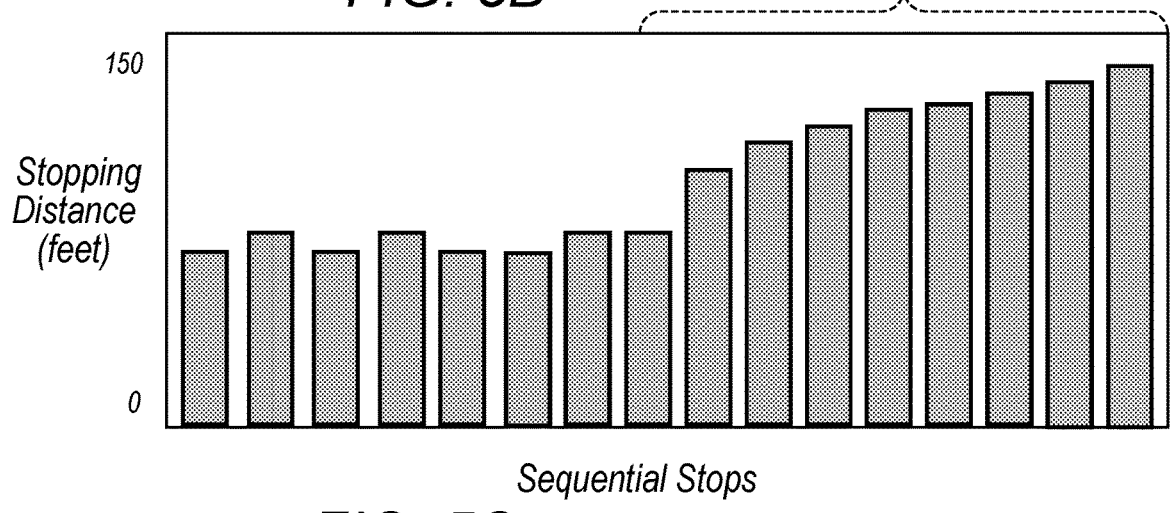

FIGS. 5A-5C illustrate other example trend signatures that may be identified by an in-vehicle analysis module and that may be correlated by the in-vehicle analysis module with a vehicle condition or anomaly, according to some embodiments.

In some embodiments, trends identified using trend signatures may further be used to determine drivability of the vehicle pending repair. For example, a drop in brake fluid pressure below a threshold amount, or a change by more than a threshold amount, may define a trend signature 1 for a low brake fluid pressure trend. Additionally, a rate of change in brake fluid canister level greater than a first threshold rate, but less than a second threshold rate, may define a trend signature 2 corresponding to a slow leak of brake fluid trend. If the rate of change of the brake fluid canister level was greater than the second threshold rate, this may correspond to a different trend signature, such as a ruptured brake fluid line trend. Additionally, a change in stopping distance between sequential stops that increases from stop to stop by more than a first threshold amount, but less than a second threshold amount, may define a trend signature of a slowly deteriorating brake performance trend, whereas if the second threshold was exceeded, that situation may correspond to a different trend signature such as an impending brake failure trend. Based on the trends identified in the braking system data shown in FIGS. 5A-5C (and the trends not present in the braking system data shown in FIGS. 5A-5C), a drivability analysis engine 104 (which may be implemented remotely in the vehicle analysis service 102 or locally in the in-vehicle analysis module 302), may determine a recommendation regarding drivability of the vehicle. For example, based on the slow leak trend and the slowly deteriorating brake performance trend and the absence of the ruptured brake fluid line trend or the absence of the impending brake failure trend, the drivability analysis engine 104 may determine that it is acceptable to drive the vehicle for 1-2 days until it can be repaired. Furthermore, the drivability analysis engine 104 may further determine other recommended restrictions, such as not to exceed 50 mph.

In some embodiments, a trend identification module 308 and/or drivability analysis engine 104 may further examine use data to determine if the user of the vehicle is likely to abide by the recommended restrictions on use. For example, if use data includes trend signatures indicating the user typically exceeds posted speeds, the drivability analysis engine 104 may determine a first recommendation indicating that the vehicle is not to be driven until repaired, whereas if the use data lacks this data signature, the drivability analysis engine 104 may provide a second recommendation indicating the vehicle can be driven for the next day until repaired if speeds are maintained below 50 mph. Thus, the drivability analysis engine may further account for user behavior when making drivability recommendations.

FIGS. 6A-6F illustrate example commands and responses that may be provided to, and received from, an in-vehicle analysis module via a user interface of a vehicle, according to some embodiments.

In some embodiments, an in-vehicle analysis module may interact with a user via various types of interfaces, such as a touchpad of the vehicle, an audio system (e.g. speakers and microphone) of the vehicle, SMS text messages sent to and from a mobile device of the user, e-mail sent to and received from an email account of the user, etc.

Figure 6A:
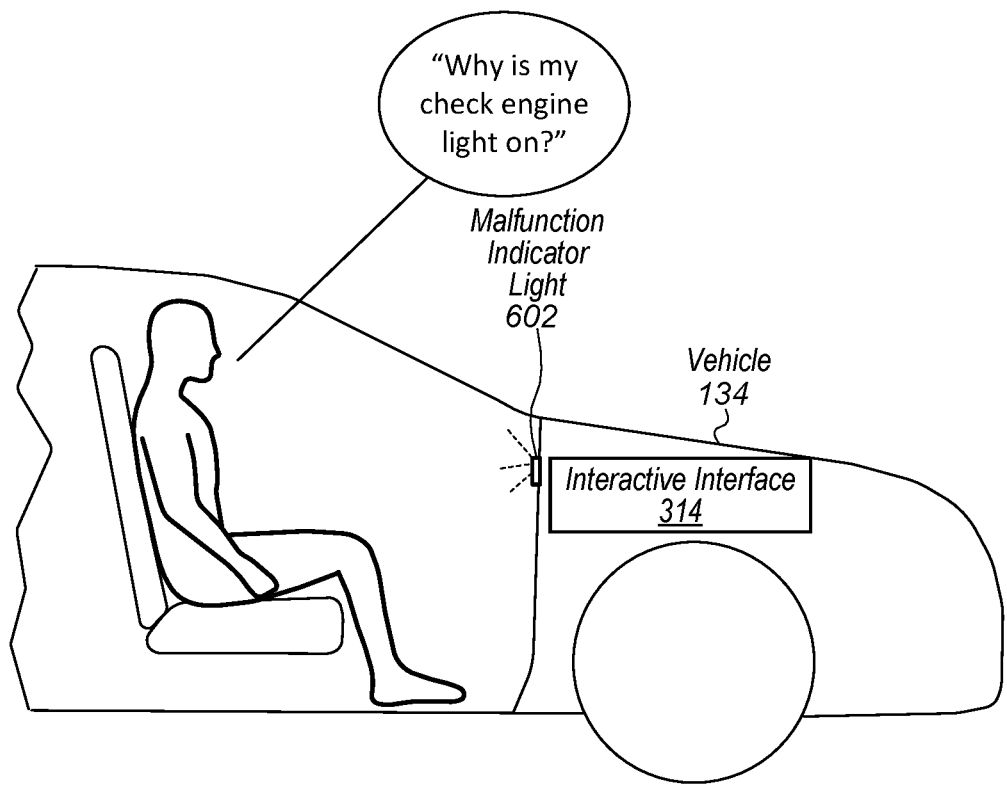
FIGS. 6A-6G illustrate example commands and responses that may be provided to, and received from, an in-vehicle analysis module via a user interface of a vehicle, according to some embodiments.
Figure 6B:
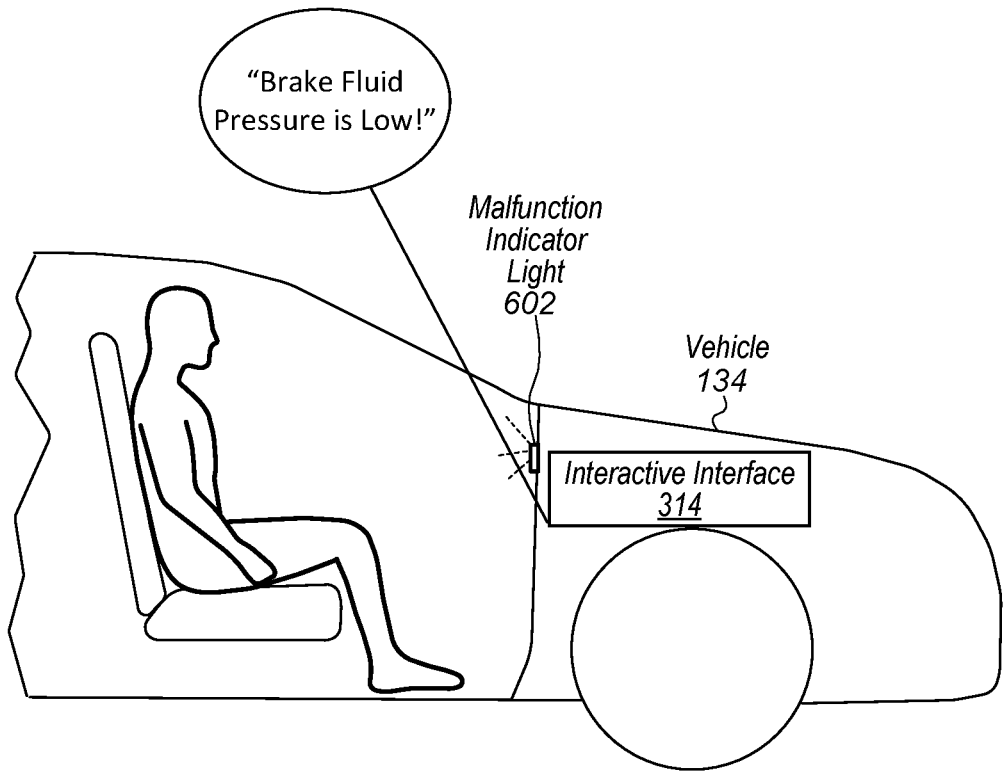
Figure 6C:
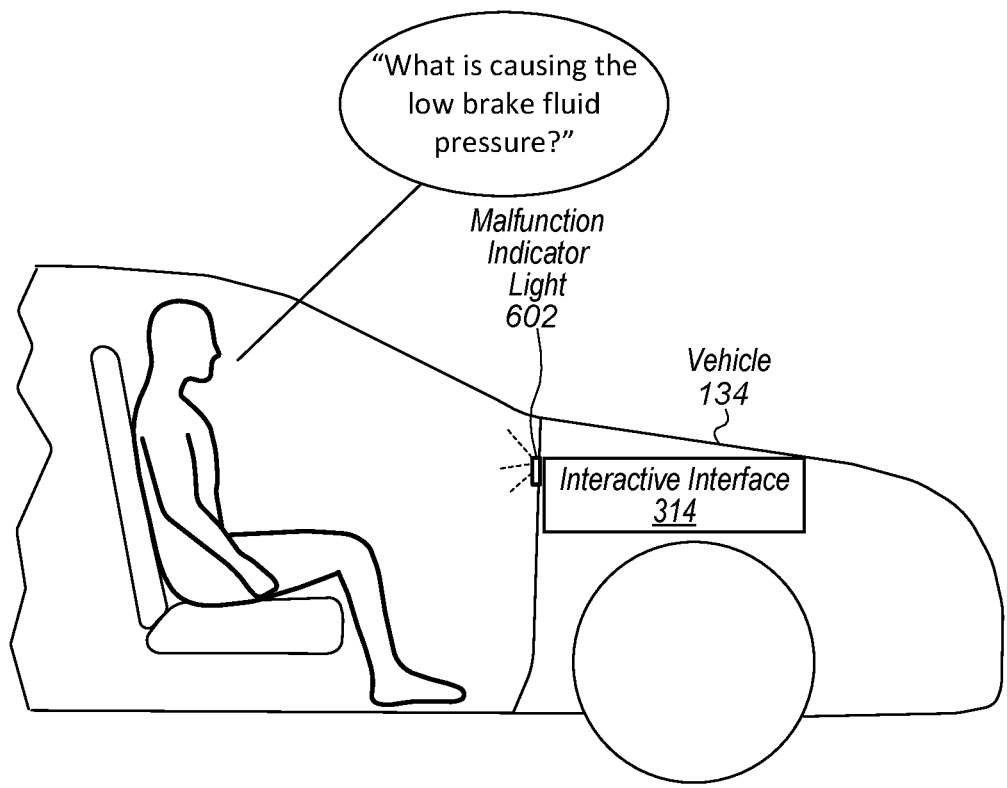
Figure 6D:
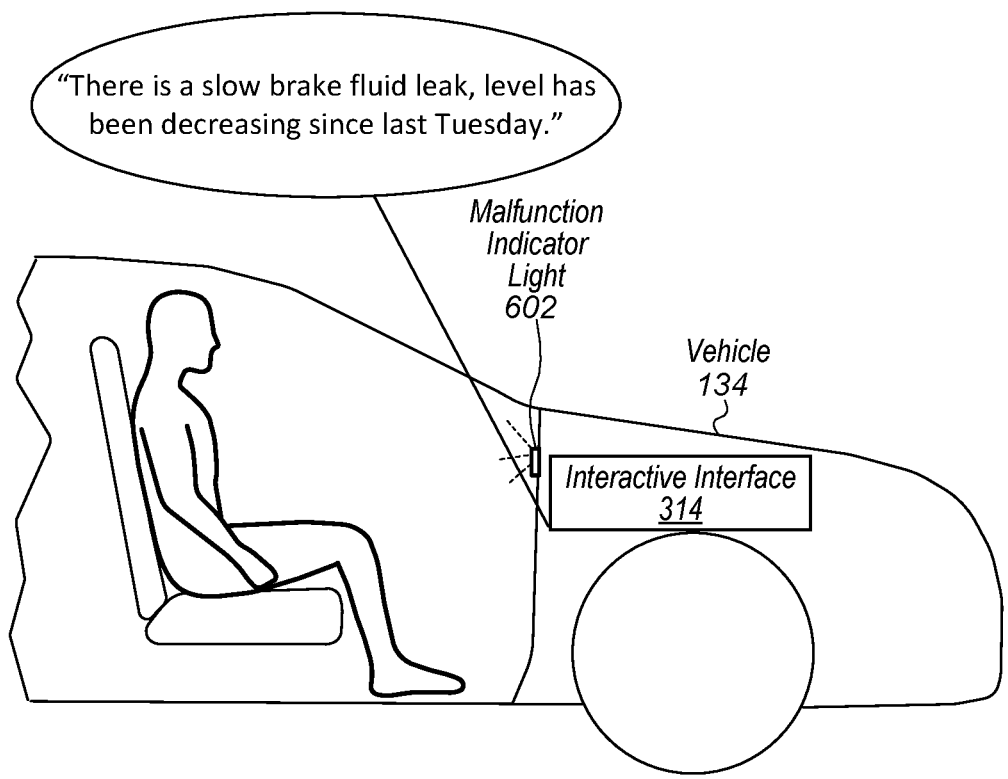
Figure 6E:
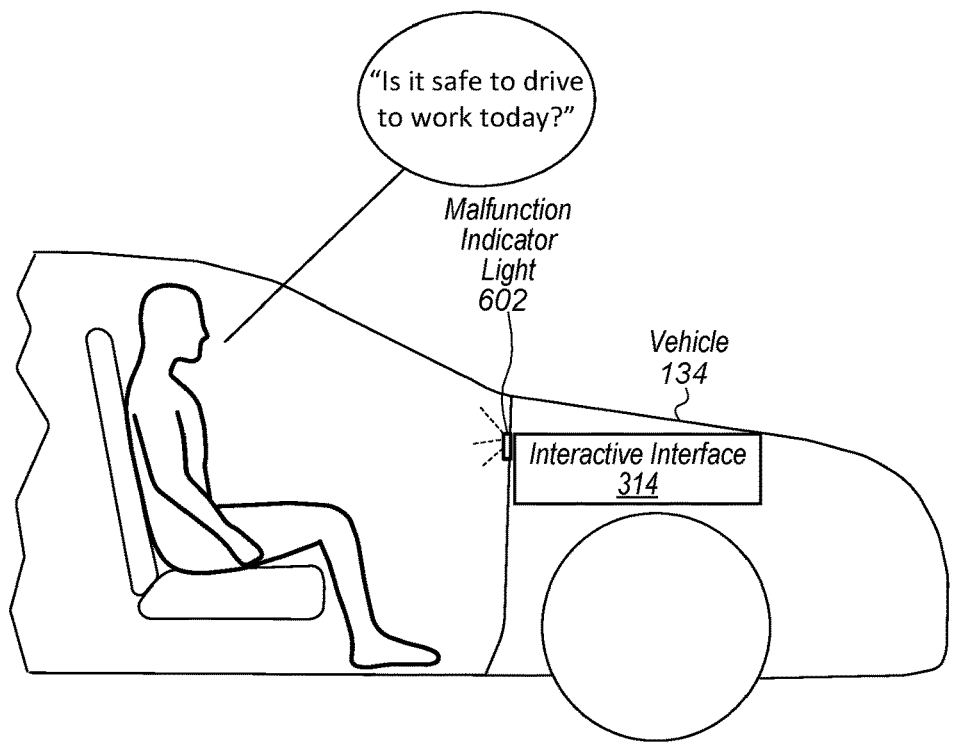
Figure 6F:
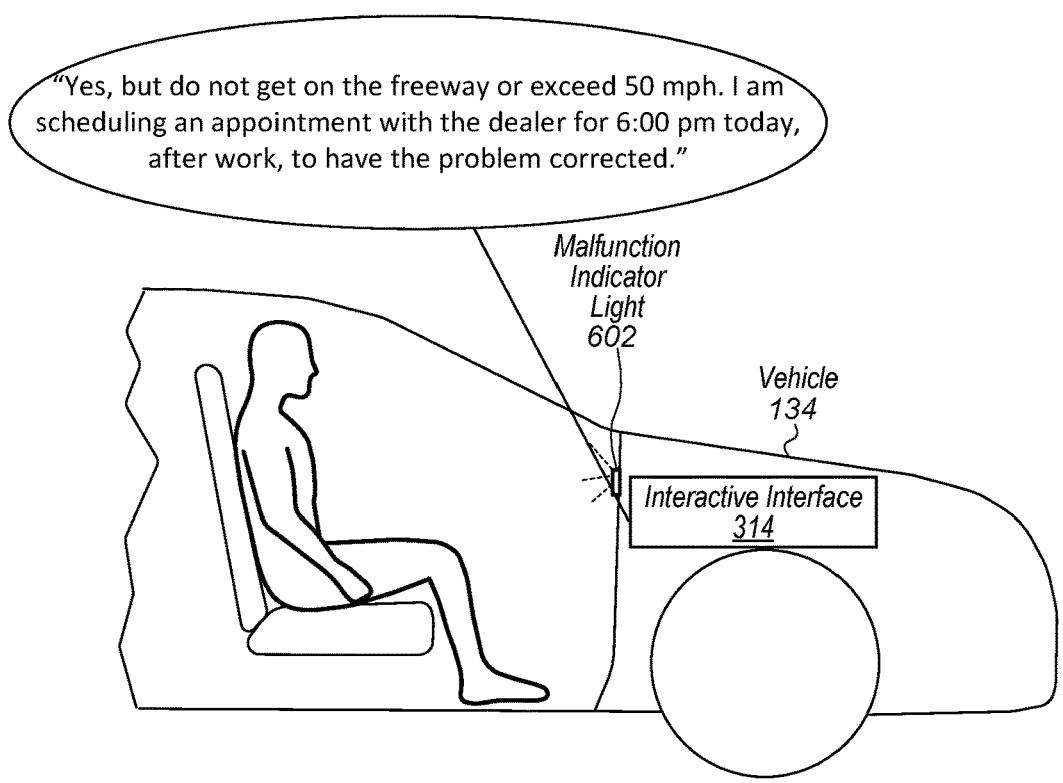

As an example, of interactions provided over an audio system of the vehicle, FIG. 6A illustrates malfunction indicator light 602 of vehicle 134 being activated and the user speaking a command directed to interactive interface 314 asking "why is my check engine light on?" As can be seen in FIG. 6B, the interactive interface 314 may issue a command to correlation module 310 asking for more information as to why the malfunction indicator light 602 has been activated. In response, the interactive interface 314 may audibly report to the user "brake fluid pressure is low." Continuing the example, in FIG. 6C, the user may further inquire to the interactive interface 314, "what is causing the low brake fluid pressure." In response the interactive interface 314 may issue a learning task to interface 316 to the vehicle analysis service and/or may issue a learning task to learning task evaluator 360 to determine if the learning task can be performed locally. As shown in FIG. 6D, in response to receiving an answer for the requested learning task, the interactive interface 314 may audibly report the results of the learning to the user, such as "there is a brake fluid leak, level has been decreasing since last Tuesday." Furthermore, the user, as shown in FIG. 6E, may inquire "is it safe to drive to work today?" In response, interactive interface 314 may send a query to drivability analysis engine 104 (implemented locally or remotely) to determine a drivability of the vehicle with the condition active in the vehicle (e.g. low brake fluid pressure). As discussed above, the drivability analysis engine 104 may determine a recommendation and/or restrictions on use of the vehicle while the condition is present. For example, in FIG. 6F, the interactive interface 314 audibly reports "Yes, but do not get on the freeway or exceed 50 mph." Additionally, the interactive interface may send a command to parts/labor scheduler 110 (implemented locally or remotely) to schedule an appointment with a mechanic to have the brake system repaired. The parts/labor scheduler may coordinate arranging labor and parts to perform the brake system repair job. Also, the interactive interface 314 may include in the reply to the user that "I am scheduling an appointment with the dealer for 6:00 pm today after work, to have the problem corrected."

Figure 6G:
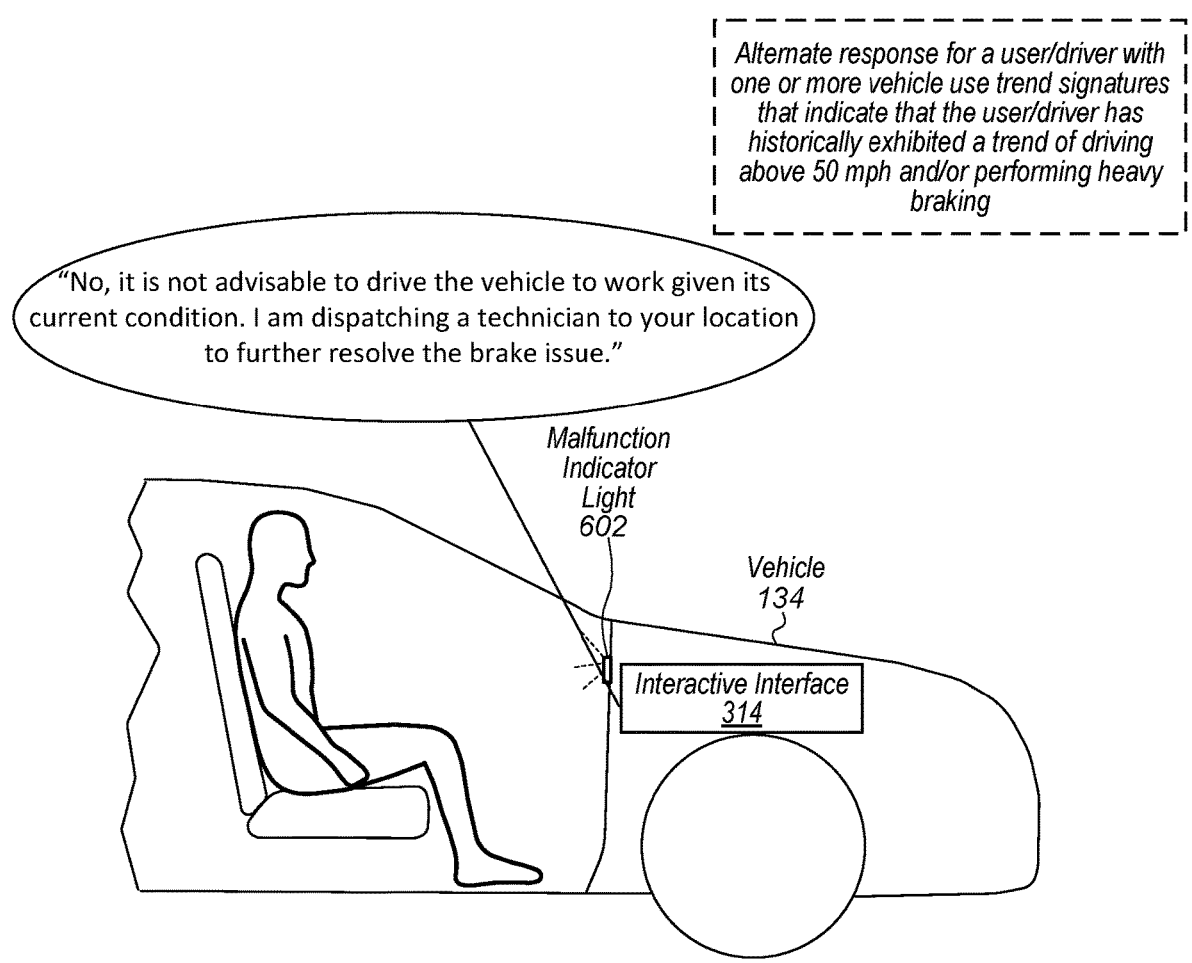

In some embodiments, the drivability analysis engine 104 may further take into account trend signatures in use data for the user of the vehicle when making drivability recommendations. For example, in the alternative response shown in FIG. 6G, the interactive interface 314 may respond to the user: "No, it is not advisable to drive the vehicle to work given its current condition. I am dispatching a technician to your location to further resolve the brake issue." For example, user data for the user in FIG. 6G may include trend signatures that the user does not follow posted speed limits, or has a habit of heavy braking. Thus, for this user a different recommendation may be provided than was provided to the user in FIG. 6F.

Figure 7:
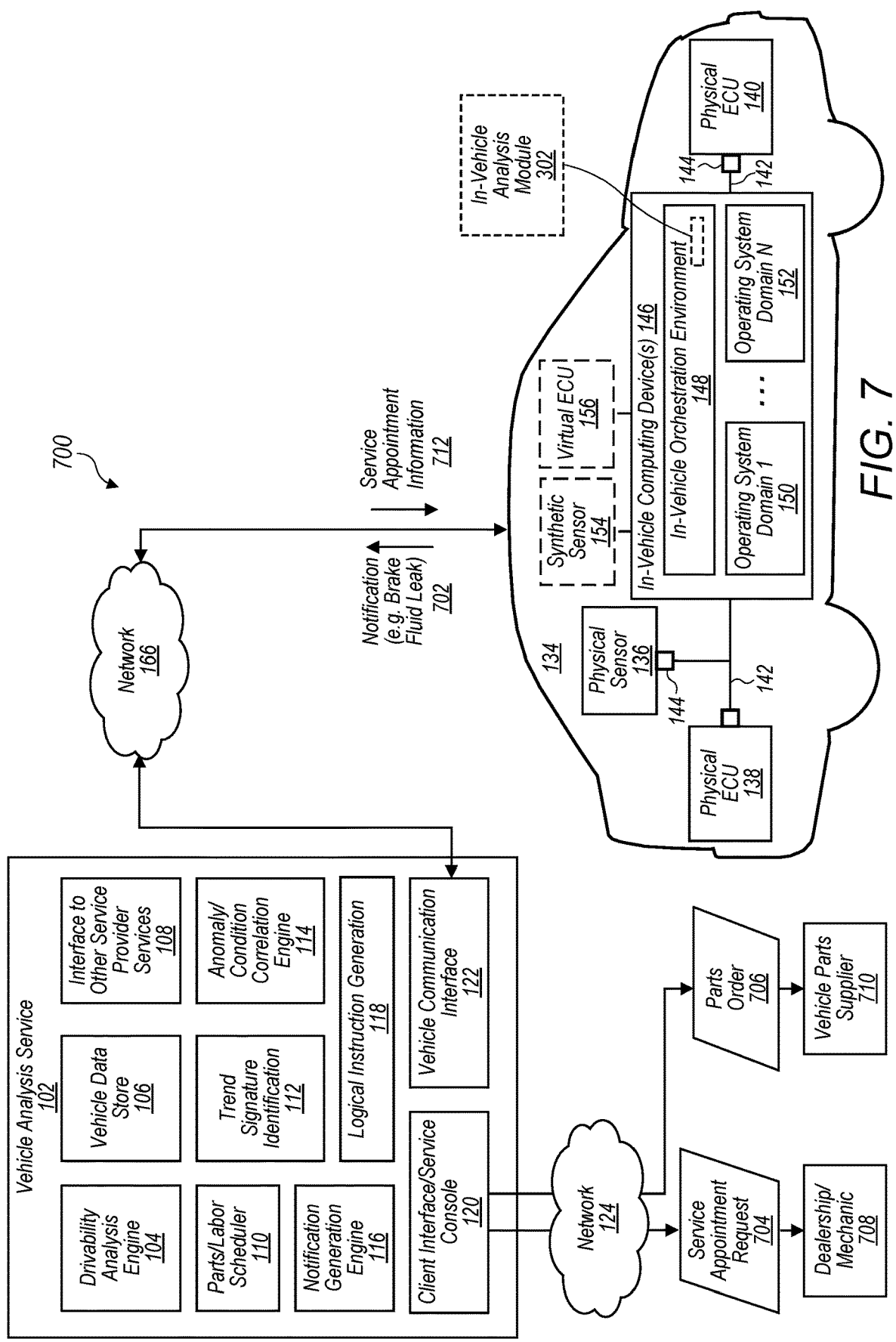
FIG. 7 illustrates an example of a vehicle analysis service coordinating with a dealership or mechanic and a parts supply chain management interface to coordinate a repair job to address a determined condition or anomaly occurring in a vehicle, according to some embodiments.

FIG. 7 illustrates an example of a vehicle analysis service coordinating with a dealership or mechanic and a parts supply chain management interface to coordinate a repair job to address a determined condition or anomaly occurring in a vehicle, according to some embodiments.

Continuing the example discussed in FIGS. 6A-6G, the in-vehicle analysis module 302 may issue notification 702 to vehicle communication interface 122 of vehicle analysis service 102. Additionally, vehicle analysis service may issue service appointment request 704 and parts order 706 to the dealership/mechanic 708 and the vehicle parts supplier 710 to coordinate the repair of the brake system. Additionally, vehicle analysis service 102 may provide service appointment information 712 back to the in-vehicle analysis module 302 to be presented to the user of the vehicle via interactive interface 314. Also, in some embodiments, service appointment request 704 and parts order 706 may be directly issued to the dealership/mechanic 708 and vehicle parts supplier 710 from in-vehicle analysis module 302, without necessarily having to be routed through vehicle analysis service 102.

Figure 8:
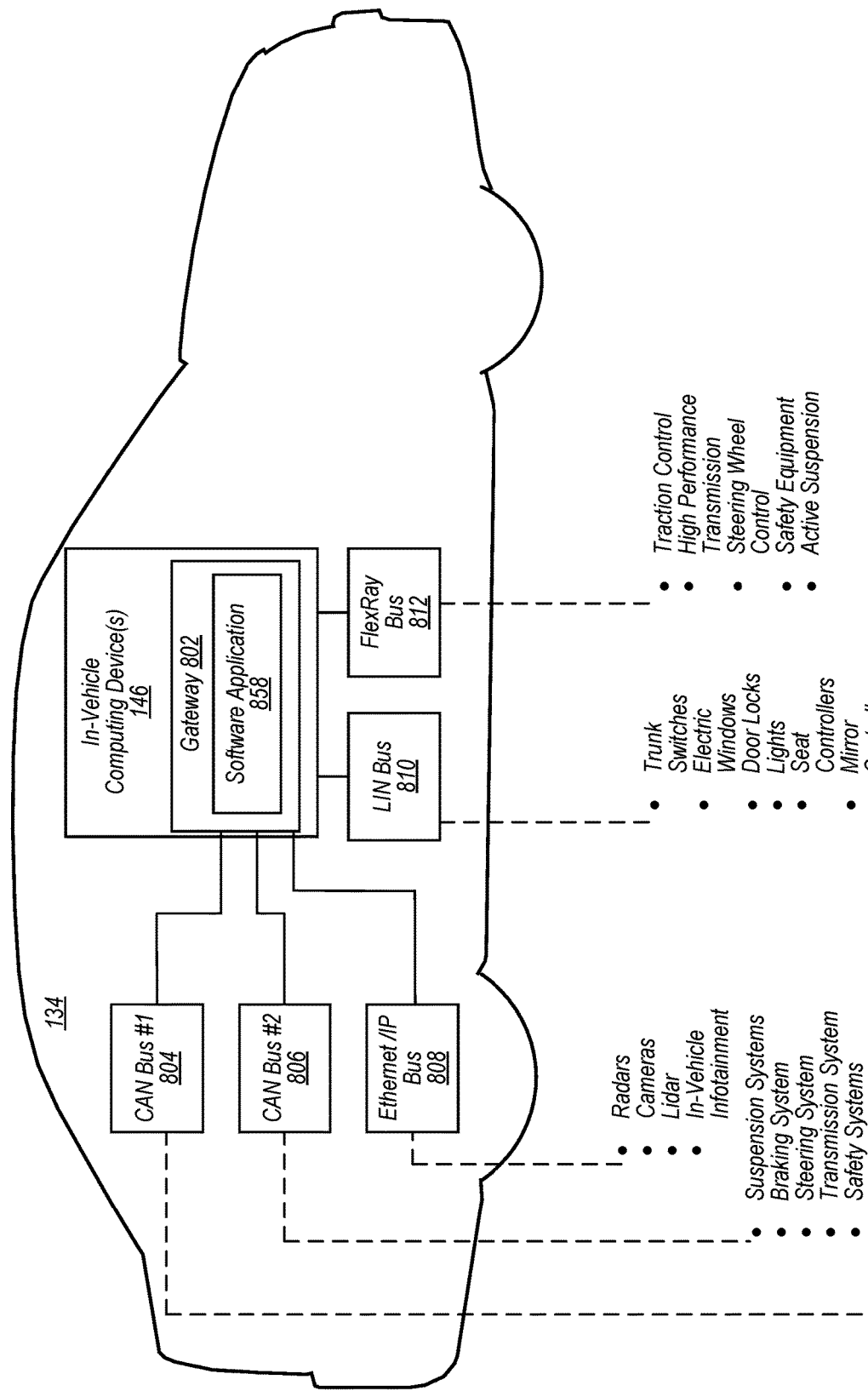
FIG. 8 illustrates example buses and components connected to the example buses that may be monitored for trend signatures for use in determining conditions or anomalies in a vehicle, according to some embodiments.

FIG. 8 illustrates an example vehicle comprising multiple different buses that may be monitored by a vehicle analysis application deployed by a vehicle analysis service, according to some embodiments.

In some embodiments, a vehicle, such as vehicle 134, may include multiple buses connected to a gateway. For example, vehicle 134 includes gateway 802 that is connected to CAN bus #1 (804), CAN bus #2 (806), Ethernet/IP bus 808, local interconnect (LIN) bus 810, and FlexRay bus 812. As shown in FIG. 4, different types of vehicle information may be transmitted over the different types of buses. In some embodiments, a customer may supply access to a proprietary dictionary for only some or all buses of a vehicles. Also the customer may specify only some or all of the buses of the vehicle are to be monitored. Additionally, the customer may specify only certain components connected to a given bus are to be monitored.

Figure 9:
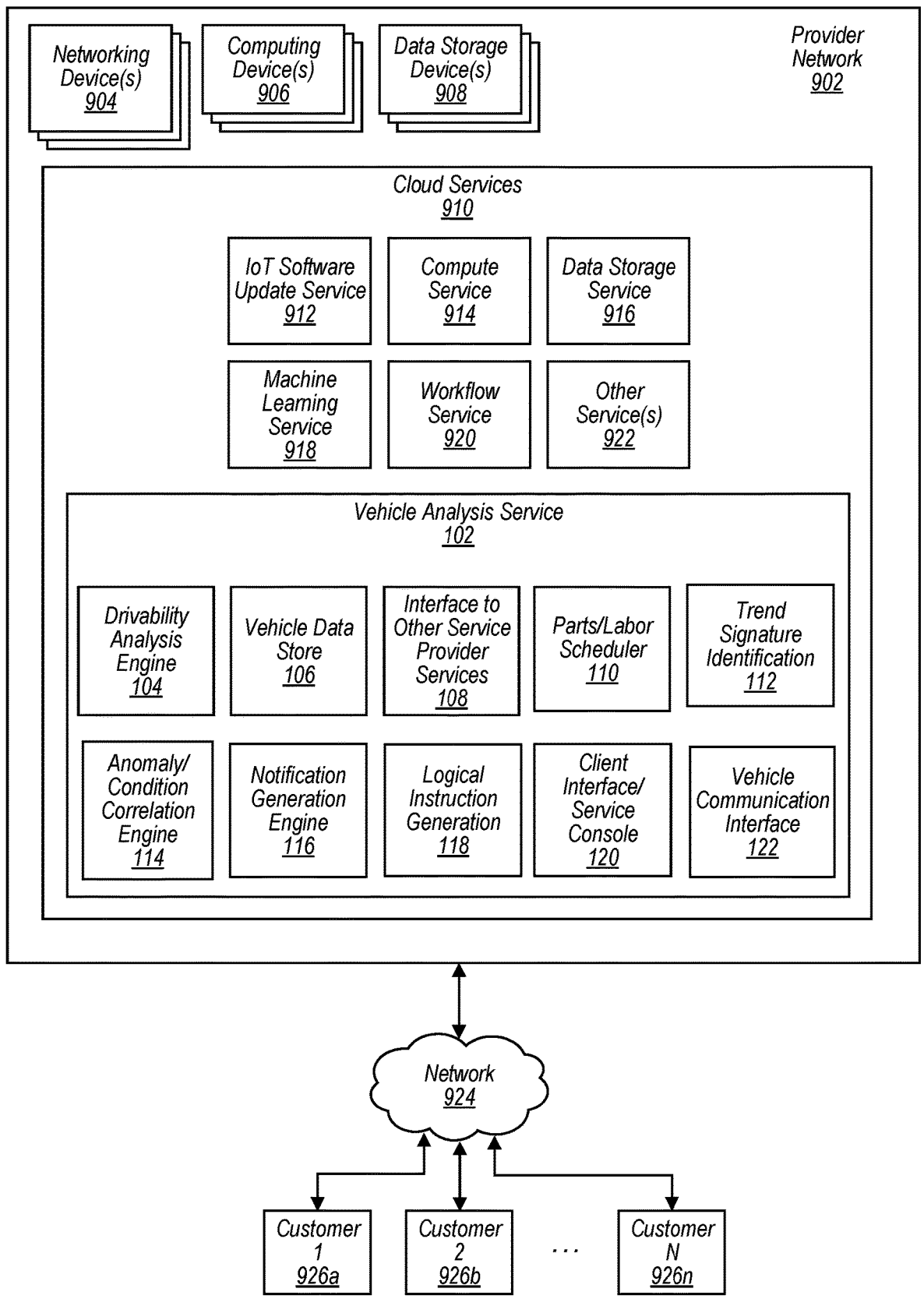
FIG. 9 illustrates a service provider network that includes a vehicle analysis service and other additional services offered by the service provider, according to some embodiments.

FIG. 9 illustrates an example provider network that includes a vehicle analysis service as well as other cloud services offered by the provider network, according to some embodiments.

In some embodiments, a provider network, such as provider network 902, includes networking devices 904, computing devices 906, and data storage devices 908 that implement cloud services 910. In some embodiments, a provider network may implement a plurality of cloud services in addition to a vehicle analysis service. For example, provider network 902 implements cloud services 910 that include IoT software update service 912, compute service 914, data storage service 916, machine learning service 918, workflow service 920, and other services 922. Cloud services 910 also includes vehicle analysis service 102.

In some embodiments, an IoT software update service, such as IoT software update service 912, may facilitate software updates on devices connected to the IoT software update service, such as vehicles 134, 162, and 164 as illustrated in FIG. 1. In some embodiments, an IoT software update service may additionally update firmware on a connected device and may utilize encrypted communications to perform the update. In some embodiments, the IoT software update service may also include identity authentication protocols to prevent unauthorized entities from altering software on a connected device, such as a vehicle, and encrypt communications to the connected device to prevent alterations to the software updates.

In some embodiments, a compute service, such as compute service 914, may include computing devices that implement virtual compute machines that may be used to analyze collected vehicle information and/or may be used to implement a vehicle analysis service.

In some embodiments, a data storage service, such as data storage service 916, may include data storage devices that implement a virtualized data storage, such as virtual data storage volume or virtual storage containers for an object-based storage. In some embodiments, a data storage service, such as data storage service 916, may be used to store collected vehicle information for a customer. Also, in some embodiments, a data storage service, such as data storage service 916, may be used to implement components of a vehicle analysis service, such as vehicle data store 106.

In some embodiments, a machine learning service may execute one or more machine learning algorithms to determine relationships in vehicle information.

In some embodiments, a workflow service, such as workflow service 920, may execute a workflow based on input data and a stored or developed workflow. For example, in some embodiments, a workflow service, such as workflow service 920, may determine actions to be taken based on identified vehicle conditions or anomalies. As an example, a workflow service may determine a filter, hose, or fluid needs to be changed or replaced. In some embodiments, a machine learning service, such as machine learning service 918, may be used to develop or improve work flows executed by workflow service 920. In some embodiments, workflow service 920 may use identified vehicle conditions or anomalies to initiate shipping of vehicle parts that are likely to be needed at a particular location in the future based on the vehicle conditions or anomalies.

In some embodiments, cloud services 910 may include various other cloud services, such as other services 922.

Figure 10:
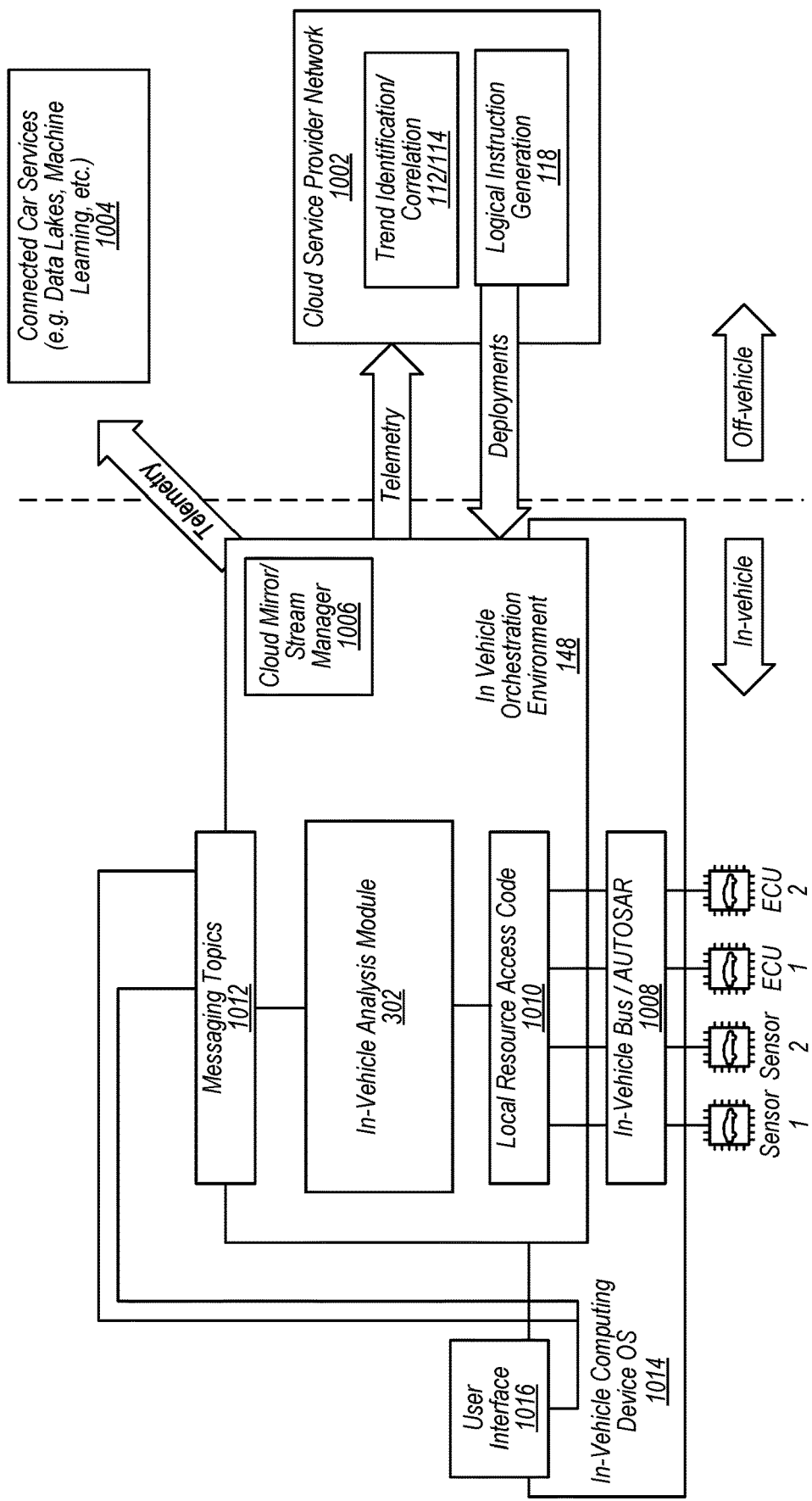
FIG. 10 illustrates an example in-vehicle orchestration environment that implements an in-vehicle analysis module, according to some embodiments.

FIG. 10 illustrates an example in-vehicle orchestration environment that implements an in-vehicle analysis module, according to some embodiments.

As shown in FIG. 10, in some embodiments an in-vehicle analysis module 302 may be implemented on top of an in-vehicle computing device operating system (OS) 1014 that includes a hardware abstraction layer (HAL), in-vehicle bus 1008, or both. The HAL or in-vehicle bus 1008 may interface with a local resource access code component 1010 of in vehicle orchestration environment 148 and the local resource access code component 1010 may allow or disallow sensor data from sensors 1 or 2 or vehicle communications from ECUs 1 or 2 to flow to or from the HAL or in-vehicle bus 1008 to or from respective components of in-vehicle orchestration environment 148, such as in-vehicle analysis module 302 or cloud mirror/stream manager 1006. Additionally, messaging topics 1012 may allow or disallow data to flow out of in-vehicle orchestration environment 148 to other in-vehicle applications, such as user interface 1016. In some embodiments, cloud mirror/stream manager component 1006 mirrors or sends sensor data, such as telemetry or ECU data such as vehicle information, to connected car services 1004.

In some embodiments, sensor data and/or vehicle information from ECUs may be provided to a storage service, such as data storage service 916 (illustrated in FIG. 9), the sensor data and/or ECU data may then be used by a machine learning service, such as machine learning service 918 (illustrated in FIG. 9). The machine learning service may determine relationships that may further be used to create new trend signatures and/or correlations.

FIG. 11 illustrates an example virtual electronic control unit (virtual ECU) service that may be used to provide a virtual ECU that implements an in-vehicle analysis module, according to some embodiments.

In some embodiments, a service provider network, such as service provider network 1102, implements virtual domain control unit (DCU) service 1104, and service provider network services such as service provider network service 1120 and service provider network service 1128. In some embodiments, service provider network 1102 may be a similar service provider network as provider network 902 illustrated in FIG. 9. In some embodiments, service provider network 1102 may comprise one or more data centers in one or more regions of the service provider network that each comprise computing, data storage, networking and/or other devices that implement the service provider network 1102. For example, service provider network service 1120 includes/is implemented using data center computing devices 1122 and data center storage devices 1124. In a similar manner, service provider network service 1128 includes/is implemented using data center computing devices 1130 and data center storage devices 1132. In some embodiments, data center computing devices and data center storage devices may include rack-mounted computing devices such as servers mounted in a data hall of a data center.

Virtual domain control unit service 1104 may be implemented using resources of other services of service provider network 1102, such as using computing resources of a computing service of the service provider network and using data storage resources of a storage service of the service provider network 1102, such as services of service provider network service 1120 or 1128.

In some embodiments, virtual domain control unit service 1104 includes code/logic depository 1106, mapping and annotation generator 1110, service interface 1108, vehicle communication interface 1112, and remote virtual DCU/ECU orchestration environment 1114. Note that in some embodiments, virtual domain control service 1104 may be used to deploy code packages to virtual DCUs, virtual ECUs, or both. Also, in some embodiments, virtual domain control unit service 1104 may be used by a customer of the virtual DCU service 1104 to reserve, allocate, de-allocate and manage virtual DCUs, virtual ECUs, or both. In some embodiments, a code package deployed to a virtual DCU or virtual ECU may be an in-vehicle analysis software package 158 as illustrated in FIG. 1. Thus, in some embodiments, in-vehicle analysis module 302 may be implemented using virtual ECUs or virtual DCUs of a virtual domain control unit service 1104. For example, FIG. 11 illustrates various locations where in-vehicle analysis module 302 may be implemented, such as locally in a vehicle 134, in a wireless network edge location 1138 or in a service provider network 1102, as a few examples.

In some embodiments, the service interface of a virtual DCU/ECU service, such as service interface 1108, may implement a service console, an application programmatic interface configured to receive vehicle code package/virtual DCU package/virtual ECU package instructions from clients through a command line interface, a graphical user interface, or other suitable interface that enables clients to select and/or design new vehicle code packages/virtual DCU packages/virtual ECU packages to be deployed to vehicles that include virtual DCU/ECU orchestration environments. Note in some embodiments, a vehicle, such as vehicle 134, may be manufactured to include virtual DCU/ECU local orchestration environment 1148 at the time of manufacture, wherein the virtual DCU/ECU local orchestration environment 1148 enables new vehicle code packages/virtual DCU packages/virtual ECU packages to be deployed to vehicle 134 subsequent to manufacture and subsequent to being put into use by an owner or operator of the vehicle 134. In some embodiments, a vehicle may be manufactured to include in-vehicle analysis module 302 implemented on in-vehicle computing device 154, and may receive updates from a vehicle analysis service 102. Also, in some embodiments, service interface 1108 of virtual domain control unit service 1104 may implement an application programmatic interface (API) configured to receive in-vehicle analysis software package 158 and subsequent updates from vehicle analysis service 102.

In some embodiments, a console/API implemented by service interface 1108 may provide clients, such as vehicle analysis service 102, with a list of available component inputs/outputs of a vehicle, such as sensors, DCUs, ECUs, actuators, etc. that are included in a vehicle and that may be used as inputs or output of a new vehicle code package, new virtual DCU package or a new virtual ECU package, such as software package 158 that implements in-vehicle analysis module 302. For example, a physical sensor list may store updated lists of available sensors that are included in various types of vehicles that are available for use by the virtual DCU/ECU local orchestration environment 1148.

In some embodiments, mapping and annotation generator 1110 may then generate a package as defined by the client via service interface 1108 to be deployed to a vehicle. In some embodiments, the client may specify annotations to be included with the vehicle code package, such as requirements for a virtual DCU or virtual ECU that is to execute/implement the vehicle code package, or mapping and annotation generator 1110 may automatically determine annotations based on the vehicle code/virtual DCU package/virtual ECU package definition received via service interface 1108.

In some embodiments, vehicle communication interface 1112 may establish a network connection with in-vehicle computing device(s) 154 and may transmit a V-DCU or V-ECU package to the virtual DCU/ECU orchestration environment 156 for deployment.

In some embodiments, in-vehicle computing device(s) 146 may implement local virtual DCU/ECU orchestration environment 1148, and the local virtual DCU/ECU orchestration environment 1148 may span one or more operating system domains of vehicle 134, such as operating system domains 150 through 152. In some embodiments, each operating system domain may be implemented on a separate in-vehicle computing device (such as separate DCUs), or may be implemented on a common in-vehicle computing device. Also, in some embodiments, local virtual DCU/ECU orchestration environment 1148 may be implemented on a same in-vehicle computing device as one or more of the operating system domains, or may be implemented on a separate in-vehicle computing device that interfaces with other in-vehicle computing devices implementing the respective operating system domains 150 through 152. Also, in some embodiments, a vehicle may include a communication bus 142 that connects the in-vehicle computing device(s) 146 to physical components, such as physical sensors 136 and 138, physical ECU 140, and physical output devices. In some embodiments, one or more different types of interfaces 144 may connect the physical components to the communication bus 142. Also, in some embodiments, local virtual DCU/ECU orchestration environment 1148 may implement one or more virtual DCUs/virtual ECUs, such as virtual DCU 1156 and virtual ECU 156. In some embodiments the virtual DCU 1156 and virtual ECU 156 may be implemented in a particular operating system domain, or may be allowed to communicate with other portions of the vehicle via a communication bus, such as communication bus 142.

In some embodiments, the local virtual DCU/ECU orchestration environment 1148 may determine placement locations for vehicle code packages/virtual DCU packages/virtual ECU packages. In some embodiments, the vehicle code packages/virtual DCU packages/virtual ECU packages may be placed in different ones of the operating system domains 150 through 152 using the local virtual DCU/ECU orchestration environment 1148. Also, the vehicle code packages may be placed at remote virtual DCU/ECUs that are configured to communicate with vehicle. For example, a vehicle code package may be placed at virtual ECU 1116 or virtual DCU 1118 included in a service provider network region and implemented in virtual DCU/ECU remote orchestration environment 1114. As another example, a vehicle code package may be placed at virtual DCU 1148 or virtual ECU 1150 included in wireless network edge location 1138 that also includes wireless communication devices 1140 that establish a wireless connection 1154 with vehicle 134. Note that wireless connection 1154 is directly between wireless edge location 1138 and vehicle 134, whereas a connection 1152 to a data center hosting computing devices that implement virtual DCU/ECU remote orchestration environment 1114 may include intermediate networking devices/hops via network 166. For example, in some embodiments, service provider edge computing devices 1142 and service provider edge storage devices 1144 may be co-located at a wireless edge location that includes wireless communication devices 1140. As a further example, wireless communication devices 1140 may be wireless antenna that implement a 5G wireless network and service provider edge computing devices 1142 and service provider edge storage devices 1144 may be physically located in a same or adjacent facility as the wireless antenna. Also, the service provider edge computing devices 1142 and service provider edge storage devices 1144 may implement the virtual DCU/ECU edge orchestration environment 1146. Note that in some embodiments, in-vehicle analysis module 302 may be implemented as a software package executing on virtual ECU 1150 or virtual DCU 1148 in wireless edge network location 1138.

In some embodiments, a virtual DCU/ECU orchestration environment, such as local virtual DCU/ECU orchestration environment 1148, virtual DCU/ECU edge orchestration environment 1146, and virtual DCU/ECU remote orchestration environment 1114 may, in response to a placement decision to place a vehicle code package in the respective virtual DCU/ECU orchestration environment, instantiate an execution thread on a virtual DCU/ECU located at the virtual DCU/ECU orchestration environment, execute code included in the vehicle code package using the execution thread implemented on the local virtual DCU/ECU, and provide results of executing the code to components at the vehicle, such as a notification module 312 or interactive interface 314, etc. Also, the results may be provided to other virtual DCUs/ECUs located at other locations such as virtual DCU 1148 or virtual ECU 1150 located at the wireless network edge, or virtual ECU 1116 or virtual DCU 1118 located in a data center of a region of the service provider network 1102.

In some embodiments, outputs from one or more first virtual DCUs or virtual ECUs may be inputs to other virtual DCUs or virtual ECUs in a same or different location. In this way a network of virtual DCUs/ECUs may be formed such that tasks that require low latencies are executed locally at a virtual DCU/ECU at the vehicle or at a wireless network edge location, while other tasks that are not as sensitive to latencies may be executed using a virtual DCU/ECU at a remote region data center, such as virtual ECU 1116 and/or virtual DCU 1118. Also, in some embodiments a virtual DCU/ECU may outsource tasks or jobs to other services of service provider network 1102. For example V-DCU task/job 1126 has been outsourced by virtual DCU 1118 to service provider network service 1120. Also, V-ECU task/job 1134 has been delegated to service provider network service 1128. For example, in some embodiments, virtual DCU 1148 or virtual ECU 1150 at the wireless network edge location may have delegated V-ECU task/job 1134 to service provider network service 1128.

FIG. 12 illustrates an example, implementation of an in-vehicle analysis module using a dongle inserted into an on-board diagnostic port (OBD port) of a vehicle, wherein the dongle is connected to a computing device in the vehicle, such as a user's portable phone, according to some embodiments.

In some embodiments, an in-vehicle computing device 146, for example as illustrated in FIG. 1, may be included in a mobile device 1202 or a dongle 1206, wherein the in-vehicle computing device 146 implements in-vehicle analysis module 302. For example, older vehicles may not include an on-board mounted computing device suited for implementing in-vehicle analysis module 302. Thus, in such vehicles, a dongle 1206 may be inserted into on-board diagnostics port 1204 to gain access to bus communications. Also, the dongle may be connected via connection 1208 to mobile computing device 1202 which has network connectivity to enable connection to a remotely implemented vehicle analysis service 102.

Figure 13A:
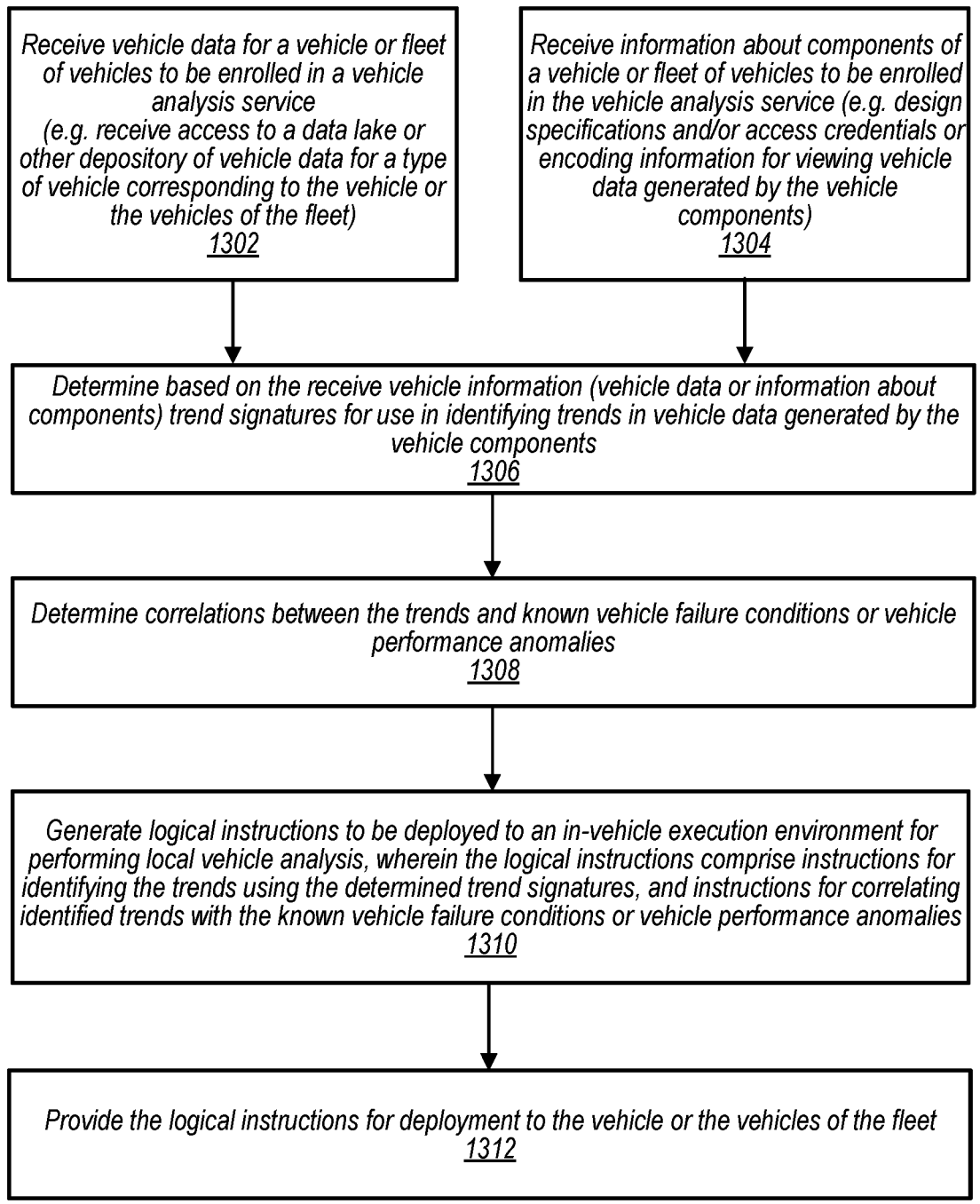
FIG. 13A illustrates an example flowchart for generating a software package to be deployed to a vehicle to implement an in-vehicle analysis module, according to some embodiments.

FIG. 13A illustrates an example flowchart for generating a software package to be deployed to a vehicle to implement an in-vehicle analysis module, according to some embodiments.

At block 1302, a vehicle analysis service receives vehicle data for a vehicle or fleet of vehicles to be enrolled in a vehicle analysis service (e.g. receive access to a data lake or other depository of vehicle data for a type of vehicle corresponding to the vehicle or the vehicles of the fleet).

At block 1304, the vehicle analysis service receives information about components of a vehicle or fleet of vehicles to be enrolled in the vehicle analysis service (e.g. design specifications and/or access credentials or encoding information for viewing vehicle data generated by the vehicle components).

At block 1306, the vehicle analysis service determines, based on the received vehicle information, trend signatures for use in trends in vehicle data (or use data) for the components of the vehicle and/or for users of the vehicle.

At block 1308, the vehicle analysis service determines correlations between the trends and known vehicle failure conditions or vehicle performance anomalies.

At block 1310, the vehicle analysis service generates logical instructions to be deployed to an in-vehicle execution environment for performing local vehicle analysis, wherein the logical instructions comprise instructions for identifying the trends using the determined trend signatures, and instructions for correlating identified trends with the known vehicle failure conditions or vehicle performance anomalies.

At block 1312, the vehicle analysis service provides the logical instructions for deployment to the vehicle or the vehicles of the fleet.

Figure 13B:
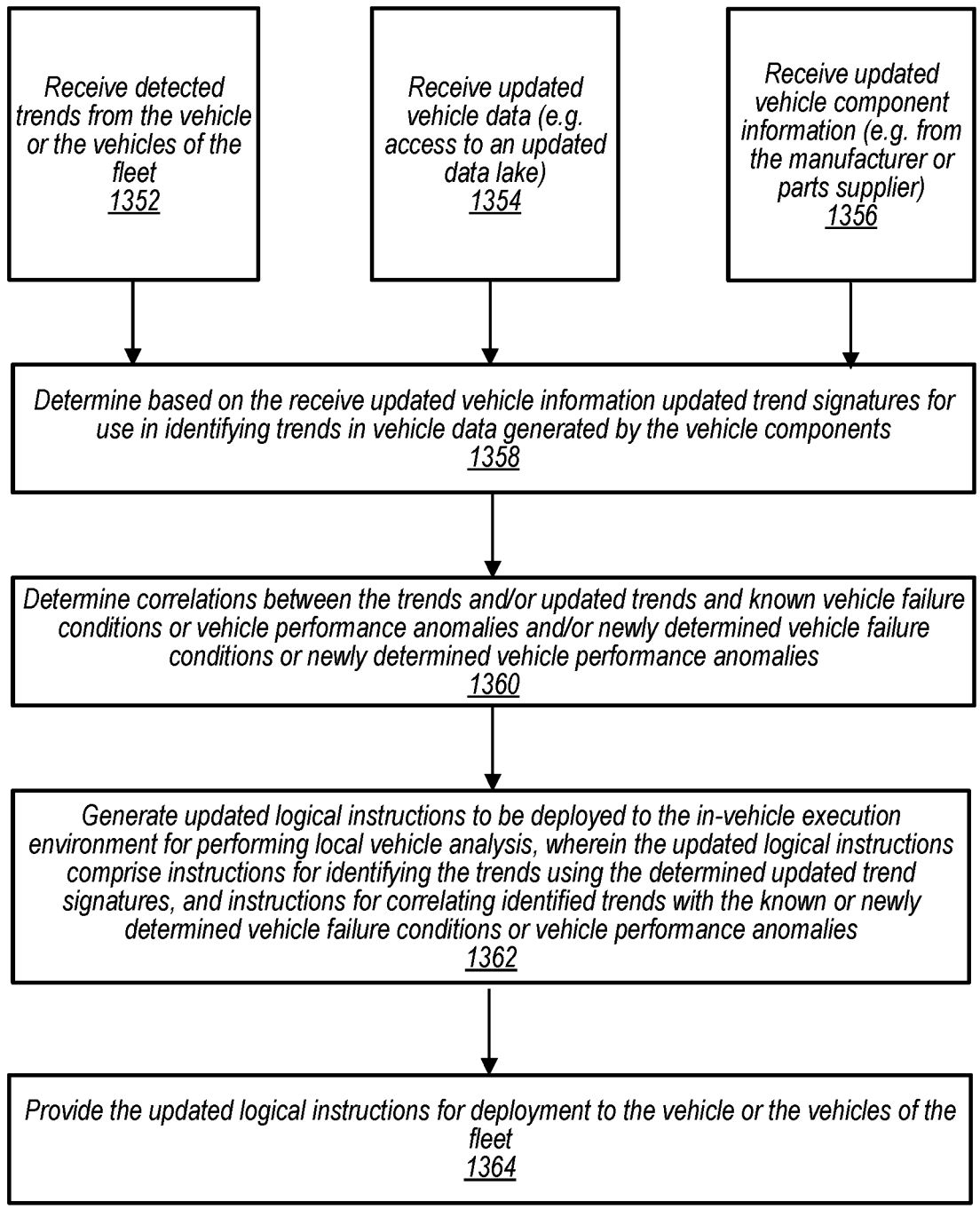
FIG. 13B illustrates an example flowchart for updating an in-vehicle analysis module based on additional information received about the vehicle or about the type of vehicle, according to some embodiments.

FIG. 13B illustrates an example flowchart for updating an in-vehicle analysis module based on additional information received about the vehicle or about the type of vehicle, according to some embodiments.

At block 1352, the vehicle analysis service receives detected trends from the vehicle or the vehicles of the fleet. At block 1354, the vehicle analysis service receives updated vehicle data (e.g. access to an updated data lake). Also, at block 1356, the vehicle analysis service receives updated vehicle component information (e.g. from the manufacturer or parts supplier). Note that the types of updates shown at 1352, 1354, and 1356 are examples, but in some embodiments, a vehicle analysis service may receive other types of updates or updates from different sources. Also, in some embodiments, the vehicle analysis service may receive updates from more or fewer sources than shown in FIG. 13B.

In response to receiving the updated information, at block 1358, the vehicle analysis service determines updated trend signatures for use in identifying trends in vehicle data generated by the vehicle components, wherein the updated trend signatures are determined based on the receive updated vehicle information.

At block 1360, the vehicle analysis service determines correlations between the trends and/or updated trends and known vehicle failure conditions or vehicle performance anomalies and/or newly determined vehicle failure conditions or newly determined vehicle performance anomalies.

At 1362, the vehicle analysis service generates updated logical instructions to be deployed to the in-vehicle execution environment for performing local vehicle analysis, wherein the updated logical instructions comprise instructions for identifying the trends using the determined updated trend signatures, and instructions for correlating identified trends with the known or newly determined vehicle failure conditions or vehicle performance anomalies.

At block 1364, the vehicle analysis service provides the updated logical instructions for deployment to the vehicle or the vehicles of the fleet.

Note that in some embodiments, elements of the vehicle analysis service may be implemented locally at the vehicle. For example, the steps of FIG. 13B may be performed locally using vehicle information recently generated by the vehicle, wherein deploying the updated logically instructions comprises updating the software of the in-vehicle analysis module 302 to incorporate the updated logical instructions generated at 1362 that include new trend signatures and/or new correlations.

Figure 14:
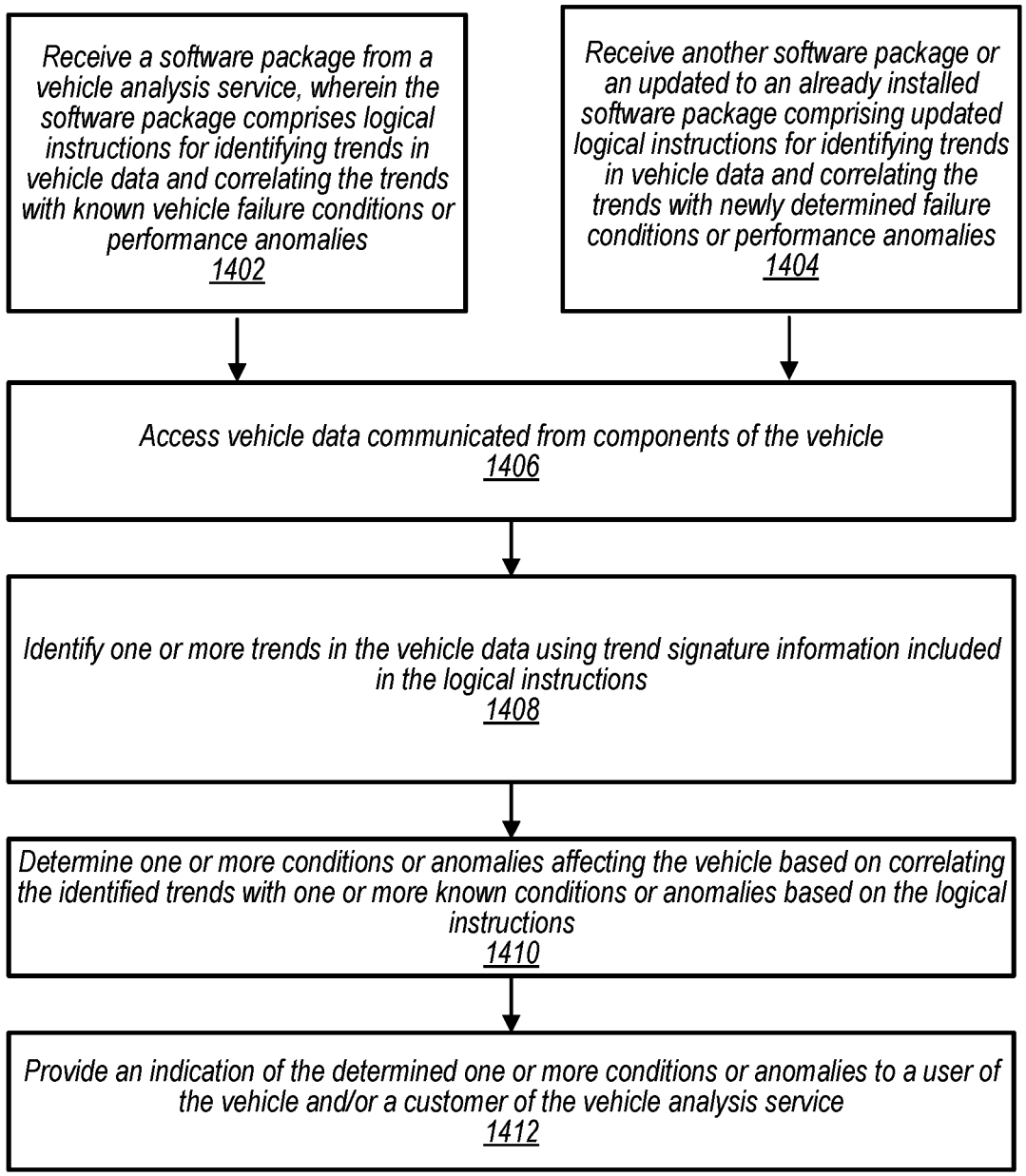
FIG. 14 illustrates an example flowchart for performing in-vehicle analysis using an in-vehicle analysis module, according to some embodiments.

FIG. 14 illustrates an example flowchart for performing in-vehicle analysis using an in-vehicle analysis module, according to some embodiments.

At block 1402, an in-vehicle analysis module, such as in-vehicle analysis module 302, receives a software package from a vehicle analysis service, wherein the software package comprises logical instructions for identifying trends in vehicle data and correlating the trends with known vehicle failure conditions or performance anomalies. In some embodiments, a vehicle many be manufactured with the software package pre-deployed to the vehicle and may later be updated.

At block 1404, the in-vehicle analysis module receives another software package or an updated to an already installed software package comprising updated logical instructions for identifying trends in vehicle data and correlating the trends with newly determined failure conditions or performance anomalies.

At block 1406, the in-vehicle analysis module accesses vehicle data communicated from components of the vehicle, such as communications flowing over communication bus 142 of vehicle 134 as illustrated in FIG. 1.

At block 1408, the in-vehicle analysis module identifies one or more trends in the vehicle data using trend signature information included in the logical instructions. For example, the accessed vehicle data may be monitored for trend signatures, such as any of those discussed herein or other trend signatures.

At block 1410, the in-vehicle analysis module determines one or more conditions or anomalies affecting the vehicle based on correlating the identified trends with one or more known conditions or anomalies based on the logical instructions.

At block 1412, the in-vehicle analysis module provides an indication of the determined one or more conditions or anomalies to a user of the vehicle and/or a customer of the vehicle analysis service.

Example Computer System

Figure 15:
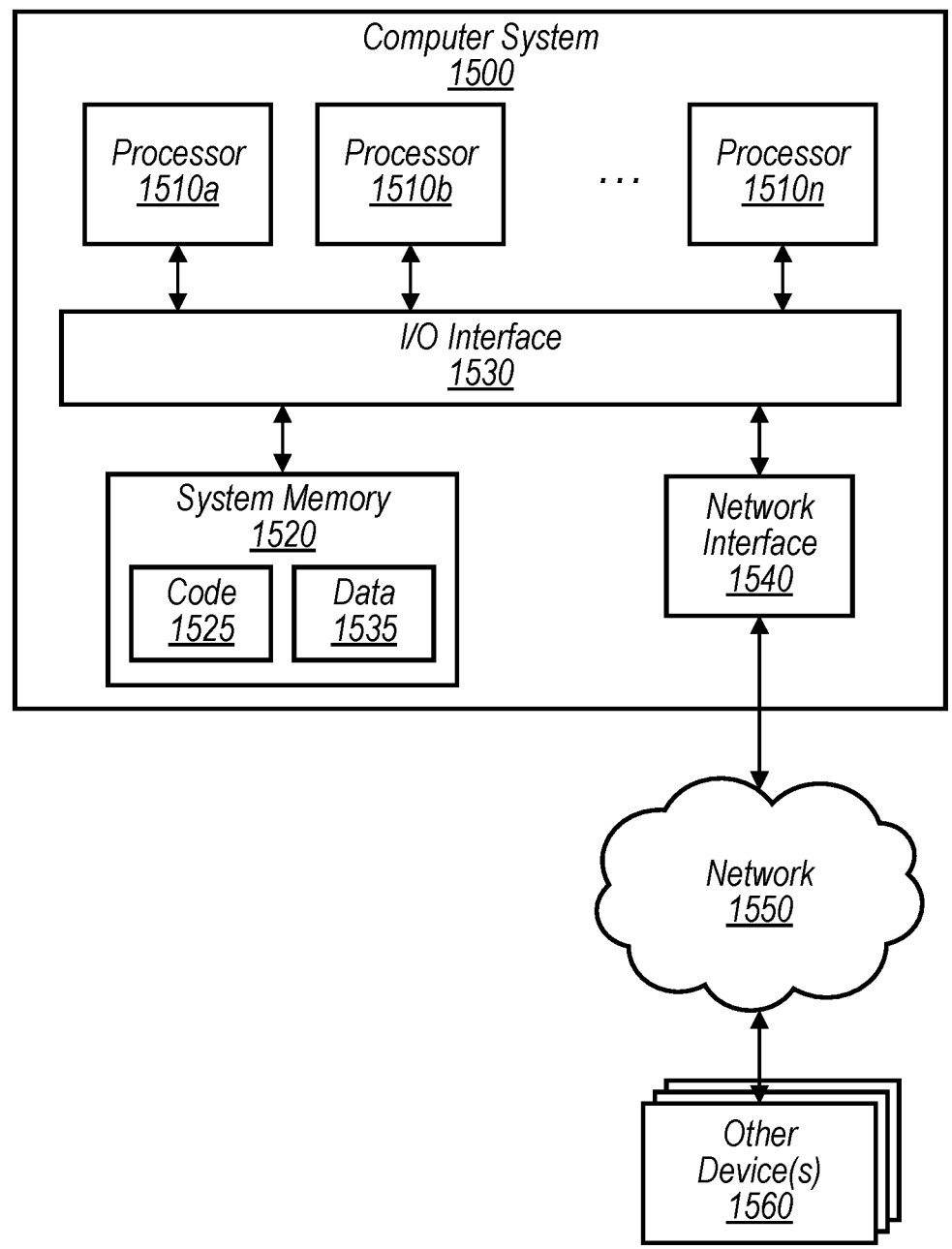
FIG. 15 is a block diagram illustrating an example computer system that implements some or all of the techniques described herein, according to some embodiments.

Any of various computer systems may be configured to implement processes associated with a vehicle analysis service, a software application/packaged deployed to a vehicle from a vehicle analysis service, a provider network that implements a vehicle analysis service, an operating system in a vehicle or device, or any other component of the above figures. For example, FIG. 15 is a block diagram illustrating an example computer system that implements some or all of the techniques described herein, according to some embodiments. In various embodiments, the vehicle analysis service, deployed software package, the provider network that implements the vehicle analysis service and other cloud services, the operating system in a vehicle or device, or any other component of the above figures FIGS. 1-14 may each include one or more computer systems 1500 such as that illustrated in FIG. 15.

In the illustrated embodiment, computer system 1500 includes one or more processors 1510 coupled to a system memory 1520 via an input/output (I/O) interface 1530. Computer system 1500 further includes a network interface 1540 coupled to I/O interface 1530. In some embodiments, computer system 1500 may be illustrative of servers implementing enterprise logic or downloadable application, while in other embodiments servers may include more, fewer, or different elements than computer system 1500.

In various embodiments, computing device 1500 may be a uniprocessor system including one processor or a multiprocessor system including several processors 1510A-1510N (e.g., two, four, eight, or another suitable number). Processors 1510A-1510N may include any suitable processors capable of executing instructions. For example, in various embodiments, processors 1510A-1510N may be processors implementing any of a variety of instruction set architectures (ISAs), such as the x86, PowerPC, SPARC, or MIPS ISAs, or any other suitable ISA. In some embodiments, processors 1510A-1510N may include specialized processors such as graphics processing units (GPUs), application specific integrated circuits (ASICs), etc. In multiprocessor systems, each of processors 1510A-1510N may commonly, but not necessarily, implement the same ISA.

System memory 1520 may be configured to store program instructions and data accessible by processor(s) 1510A-1510N. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1520 as code (i.e., program instructions) 1525 and data 1535.

In one embodiment, I/O interface 1530 may be configured to coordinate I/O traffic between processors 1510A-1510N, system memory 1520, and any peripheral devices in the device, including network interface 1540 or other peripheral interfaces. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, I/O interface 1530 may include support for devices attached via an automotive CAN bus, etc. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processors 1510A-1510N.

Network interface 1540 may be configured to allow data to be exchanged between computing device 1500 and other devices 1560 attached to a network or networks 1550. In various embodiments, network interface 1540 may support communication via any suitable wired or wireless general data networks, such as types of Ethernet networks, cellular networks, Bluetooth networks, Wi-Fi networks, Ultra-wideband Networks, for example. Additionally, network interface 1540 may support communication via telecommunications/telephony networks such as analog voice networks or digital fiber communications networks, via storage area networks such as Fibre Channel SANs, or via any other suitable type of network and/or protocol.

In some embodiments, system memory 1520 may be one embodiment of a computer-readable (i.e., computer-accessible) medium configured to store program instructions and data as described above for implementing embodiments of the corresponding methods, systems, and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 1500 via I/O interface 1530. One or more non-transitory computer-readable storage media may also include any volatile or non-volatile media such as RAM (e.g. SDRAM, DDR SDRAM, RDRAM, SRAM, etc.), ROM, etc., that may be included in some embodiments of computing device 1500 as system memory 1520 or another type of memory. Further, a computer-readable medium may include transmission media or signals such as electrical, electromagnetic, or digital signals, conveyed via a communication medium such as a network and/or a wireless link, such as may be implemented via network interface 1540. Portions or all of multiple computing devices such as that illustrated in FIG. 15 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
   one or more computing devices configured to implement a vehicle analysis service, wherein to implement the vehicle analysis service, the one or more computing devices are configured to:
   receive vehicle information generated by one or more vehicle sensors or vehicle electronic control units of a vehicle, the information corresponding to use of the vehicle by a first user;
   determine, for the first user, based on the vehicle information, determined user vehicle use trend signatures for use in identifying trends in the vehicle information generated by the one or more vehicle sensors or vehicle electronic control units of the vehicle, wherein the determined user vehicle use trend signatures have a correlation to an anomaly of the vehicle and have another correlation to a repeated use pattern by the first user of a plurality of users of the vehicle, wherein the repeated use pattern by the first user of the vehicle is different than a second repeated use pattern by a second user of the vehicle, and wherein the second repeated use pattern has a correlation to another anomaly;
   correlate, based on the received vehicle information, the one or more of the determined user vehicle use trend signatures with the anomaly of the vehicle;
   generate logical instructions, based on the received vehicle information, to be provided for deployment to the vehicle, wherein the logical instructions comprise:
      instructions for detecting, at the vehicle, one or more instances of the trends in currently generated vehicle information based on the determined trend signatures; and
      instructions for correlating one or more of the detected instances of the trends with the anomaly of the vehicle;
   provide the logical instructions for deployment to the vehicle;
   receive one or more requests for additional vehicle information for the anomaly of the vehicles; and
   provide, based on the received vehicle information, the additional vehicle information to the vehicle to present to the first user.

2. The system of claim 1, wherein the one or more computing devices configured to implement the vehicle analysis service, are further configured to:
   receive an indication of the one or more of the detected instances of the trends detected in the currently generated vehicle information from the vehicle;
   determine additional vehicle anomalies based on the received indication of the one or more detected instances of the trends; and
   provide an indication of the additional vehicle anomalies to the vehicle for presentment via a user interface of the vehicle.

3. The system of claim 2, wherein the one or more computing devices configured to implement the vehicle analysis service, are further configured to:
   implement an application programmatic interface (API) configured to:
      receive the indication of the one or more detected instances of the trends from the vehicle; and provide the indication of the additional vehicle anomalies to the vehicle for presentment via the user interface of the vehicle.

4. The system of claim 1, wherein the one or more computing devices configured to implement the vehicle analysis service, are further configured to:
provide the logical instructions as part of a software package that is to be deployed to the vehicle,
wherein the software package, when executed in the vehicle implements a local vehicle analysis module for the vehicle that is configured to identify anomalies of the vehicle based on the determined user vehicle use trend signatures being present in currently generated vehicle information of the vehicle.

5. The system of claim 4, wherein the software package further comprises:
definitions for deciphering encoded vehicle information communicated over a bus of the vehicle; and
access credentials for accessing the encoded vehicle information communicated over the bus of the vehicle.

6. The system of claim 1, wherein the one or more computing devices configured to implement the vehicle analysis service, are further configured to:
implement a notification service application programmatic interface (API) for the vehicle analysis service, wherein the notification service API is configured to:
receive, from a computing system of the vehicle, an indication than an anomaly has been detected in the vehicle; and
issue a notification to an account associated with the vehicle, wherein the notification indicates the detected anomaly.

7. The system of claim 6, wherein the one or more computing devices configured to implement the vehicle analysis service, are further configured to:
determine a drivability recommendation for the vehicle based on the vehicle information for the vehicle and the received indication that an anomaly has been detected in the vehicle, wherein the drivability recommendation takes into consideration an impact of the detected anomaly on performance of the vehicle; and
provide the determined drivability recommendation with the notification issued to the account associated with the vehicle.

8. The system of claim 7, wherein the notification is issued to the vehicle for presentation to the particular user of the vehicle via a voice controlled user interface of the vehicle.

9. The system of claim 8, wherein the user interface of the vehicle is configured to receive commands from the user of the vehicle, and wherein the one or more computing devices configured to implement the vehicle analysis service, are further configured to:
receive a command from the particular user of the vehicle requesting additional information related to the notification;
determine a response to the received command requesting additional information related to the notification based on vehicle information stored for the vehicle and the received indication that an anomaly has been detected in the vehicle; and
provide the response to the vehicle for presentment to the particular user of the vehicle via the user interface of the vehicle.

10. The system of claim 6, wherein the one or more computing devices configured to implement the vehicle analysis service, are further configured to:
issue a notification to an additional party associated with the account associated with the vehicle, wherein the notification to the additional party is for use in organizing materials and labor for addressing the detected anomaly.

11. A system, comprising:
a computing device located in a vehicle, wherein the computing device is configured to:
receive a software package from a vehicle analysis service, the software package comprising logical instructions for identifying an anomaly affecting one or more components of the vehicle based on one or more instances of trends in vehicle data generated by one or more vehicle sensors or vehicle electronic control units of the vehicle;
execute the logical instructions to implement a local vehicle analysis module, wherein the logical instructions, when executed cause the computing device mounted in the vehicle to:
access currently generated vehicle data communicated from the one or more vehicle sensors or vehicle electronic control units of the vehicle;
identify at the vehicle, the one or more instances of the trends in the currently generated vehicle data based on user vehicle use trend signatures for a user of a plurality of users of the vehicle, included in the logical instructions, wherein the user vehicle use trend signatures have a correlation to the anomaly of the vehicle and have another correlation to a repeated use pattern by the user, wherein the repeated use pattern by the user is different than a second repeated use pattern by a second user of the vehicle, and wherein the second repeated use pattern has a correlation to another anomaly;
determine the anomaly affecting the one or more components of the vehicle based on one or more correlations indicated in the logical instructions, wherein the one or more correlations correlate the user vehicle use trend signatures with the anomaly affecting the one or more components of the vehicle;
notify a user of the vehicle of the determined anomaly affecting the one or more components of the vehicle;
receive, from the user of the vehicle, a query for additional vehicle information for the anomaly affecting the one or more components of the vehicle;
send, based on the received query, a request to the vehicle analysis service for the additional vehicle information for the anomaly affecting the one or more components of the vehicle; and
provide to the user of the vehicle the additional vehicle information received from the vehicle analysis service, wherein the additional information is provided by the vehicle analysis service based on the vehicle data generated by the one or more components of the vehicle.

12. The system of claim 11, wherein the currently generated vehicle data communicated from the one or more vehicle sensors or vehicle electronic control units of the vehicle that is accessed by the local vehicle analysis module comprises vehicle data communicated over a bus of the vehicle to, or from, electronic control units (ECUs) of the vehicle.

13. The system of claim 11, wherein the computing device mounted in the vehicle is configured to implement an in-vehicle orchestration environment for synthetic sensors, wherein the logical instructions are implemented as a synthetic sensor of the in-vehicle orchestration environment.

14. The system of claim 11, wherein the computing device mounted in the vehicle is configured to implement an in-vehicle orchestration environment configured to communicate with edge computing resources of a service provider network to implement a virtual electronic control unit (virtual ECU), wherein the logical instructions are implemented using a virtual ECU connected to the in-vehicle orchestration environment.

15. The system of claim 11, wherein the computing device mounted in the vehicle is a portable computing device of the user of the vehicle, wherein the portable computing device is configured to wirelessly communicate with an interface device coupled to an on-board diagnostic port of the vehicle to access the currently generated vehicle data.

16. The system of claim 11, wherein the software package comprises:
   definitions for deciphering encoded vehicle data communicated over a bus of the vehicle; and
   access credentials for accessing the encoded vehicle data communicated over the bus of the vehicle, and
wherein the logical instructions, when executed by the computing device, further cause the computing device to:
   provide access credentials to one or more processes executing on the components of the vehicle in order to gain access to the encoded vehicle data communicated over the bus of the vehicle; and
   decode at least a portion of the encoded vehicle data based on the definitions included in the software package.

17. A method, comprising:
   receiving, at a vehicle, logical instructions comprising:
      instructions for detecting, at the vehicle, instances of trends in currently generated vehicle data based on user vehicle use trend signatures, wherein the vehicle data is generated by one or more vehicle sensors or vehicle electronic control units and wherein the user vehicle use trend signatures have a correlation to an anomaly of the vehicle and have another correlation to a repeated use pattern by a user of a plurality of users of the vehicle; and
      instructions for correlating one or more of the detected instances of the trends with the anomaly affecting the one or more components of the vehicle;
   identifying the one or more instances of trends in the currently generated vehicle data based on the user vehicle use trend signatures for the user, included in the logical instructions, wherein the repeated use pattern by the user is different than a second repeated use pattern by a second user of the vehicle, and wherein the second repeated use pattern has a correlation to another anomaly;
   correlating the one or more instances of the trends in the currently generated vehicle data with a given anomaly affecting one or more components of the vehicle, based on the instructions for performing the correlating included in the logical instructions;
   notifying a user of the vehicle of the determined anomaly affecting the one or more components of the vehicle;
   receiving, from the user of the vehicle, a query for additional vehicle information for the anomaly affecting the one or more components of the vehicle;
   sending, based on the received query, a request to the vehicle analysis service for the additional vehicle information for the anomaly affecting the one or more components of the vehicle; and
   providing to the user of the vehicle the additional vehicle information received from the vehicle analysis service, wherein the additional information is provided by the vehicle analysis service based on the vehicle data generated by the one or more vehicle sensors or vehicle electronic control units of the vehicle.

18. The method of claim 17, wherein said receiving, said identifying, said correlating, and said providing are performed locally by one or more computing devices within the vehicle.

19. The method of claim 18, wherein the logical instructions are received from a vehicle analysis service via a wireless network interface of the vehicle that is configured to communicate with the vehicle analysis service.

20. The method of claim 17, wherein the anomaly is causing a malfunction indicator light of the vehicle to be activated, and
   wherein the indication of the determined anomaly provides the user of the vehicle with a determined cause as to why the malfunction light is activated.

* * * * *